US012526445B2

(12) United States Patent
Hu

(10) Patent No.: US 12,526,445 B2
(45) Date of Patent: Jan. 13, 2026

(54) VIDEO ENCODING METHOD AND APPARATUS, VIDEO DECODING METHOD AND APPARATUS, COMPUTER-READABLE MEDIUM, AND ELECTRONIC DEVICE

(71) Applicant: Tencent Technology (Shenzhen) Company Limited, Shenzhen (CN)

(72) Inventor: Ye Hu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 424 days.

(21) Appl. No.: 17/968,730

(22) Filed: Oct. 18, 2022

(65) Prior Publication Data
US 2023/0062131 A1    Mar. 2, 2023

Related U.S. Application Data

(63) Continuation of application No. PCT/CN2022/075647, filed on Feb. 9, 2022.

(30) Foreign Application Priority Data

Mar. 14, 2021    (CN) .................. 202110273048.X

(51) Int. Cl.
H04N 19/52    (2014.01)
H04N 19/105    (2014.01)
H04N 19/176    (2014.01)

(52) U.S. Cl.
CPC .......... *H04N 19/52* (2014.11); *H04N 19/176* (2014.11); *H04N 19/105* (2014.11)

(58) Field of Classification Search
CPC ...... H04N 19/176; H04N 19/70; H04N 19/52; H04N 19/91; H04N 19/46; H04N 19/513;
(Continued)

(56) References Cited

U.S. PATENT DOCUMENTS

2015/0373370 A1    12/2015    Rapaka et al.
2018/0007359 A1    1/2018    Hsiang
(Continued)

FOREIGN PATENT DOCUMENTS

CN    106797473 A    5/2017
CN    109076230 A    12/2018
(Continued)

OTHER PUBLICATIONS

Tencent Technology (Shenzhen) Company Limited, WO, PCT/CN2022/075647, Apr. 28, 2022, 4 pgs.
(Continued)

*Primary Examiner* — Farhan Mahmud
(74) *Attorney, Agent, or Firm* — Morgan, Lewis & Bockius LLP

(57) ABSTRACT

Embodiments of this application provide a method, an apparatus, a non-transitory computer-readable medium, and an electronic device for coding and decoding a video. The video decoding method includes: obtaining an absolute value of a first direction component of a string vector difference through decoding from a bitstream; obtaining a sign value of the first direction component of the string vector difference through decoding from the bitstream, when the absolute value of the first direction component of the string vector difference is not 0; and determining a value of the first direction component of the string vector difference according to the absolute value of the first direction component of the string vector difference and the sign value of the first direction component of the string vector difference.

20 Claims, 14 Drawing Sheets

(58) Field of Classification Search
CPC .... H04N 19/61; H04N 19/463; H04N 19/137; H04N 19/577
See application file for complete search history.

(56) References Cited

U.S. PATENT DOCUMENTS

2018/0295387 A1   10/2018  George et al.
2021/0029359 A1    1/2021  Haase et al.
2022/0159291 A1*   5/2022  Salehifar ............... H04N 19/70

FOREIGN PATENT DOCUMENTS

| CN | 111641827 A | 9/2020 |
| CN | 111866512 A | 10/2020 |
| CN | 112055219 A | 12/2020 |
| CN | 112073719 A | 12/2020 |
| CN | 112218092 A | 1/2021 |
| CN | 114615504 A | 6/2022 |
| EP | 4246975 A1 | 9/2023 |
| GB | 2527354 A | 12/2015 |

OTHER PUBLICATIONS

Tencent Technology (Shenzhen) Company Limited, IPRP, PCT/CN2022/075647, Sep. 12, 2023, 5 pgs.
Tencent Technology, ISR, PCT/CN2022/075647, Apr. 28, 2022, 2 pgs.
Tencent Technology, Extended European Search Report, EP Patent Application No. 22770227.1, Sep. 13, 2024, 25 pgs.

* cited by examiner

VIDEO ENCODING METHOD AND APPARATUS, VIDEO DECODING METHOD AND APPARATUS, COMPUTER-READABLE MEDIUM, AND ELECTRONIC DEVICE

CROSS-REFERENCE TO RELATED APPLICATIONS

This application is a continuation application of PCT Patent Application No. PCT/CN2022/075647, entitled "VIDEO ENCODING METHOD AND APPARATUS, VIDEO DECODING METHOD AND APPARATUS, COMPUTER-READABLE MEDIUM, AND ELECTRONIC DEVICE" filed on Feb. 9, 2022, which claims priority to Chinese Patent Application No. 202110273048.X, filed with the State Intellectual Property Office of the People's Republic of China on Mar. 14, 2021, and entitled "VIDEO ENCODING METHOD AND APPARATUS, VIDEO DECODING METHOD AND APPARATUS, COMPUTER-READABLE MEDIUM, AND ELECTRONIC DEVICE", all of which are incorporated herein by reference in their entirety.

FIELD OF THE TECHNOLOGY

This application relates to the field of computer and communication technologies, and in particular, to a method, an apparatus, a computer-readable medium, and an electronic device for coding and decoding a video.

BACKGROUND OF THE DISCLOSURE

In some video coding standards, a procedure of a motion vector coding method used by a string vector (SV) in an intra string copy (ISC) mode is relatively cumbersome, and the encoding and decoding complexity is relatively high, which affects the video encoding and decoding efficiency.

SUMMARY

Embodiments of this application provide a video encoding method and apparatus, a video decoding method and apparatus, a computer-readable medium, and an electronic device, which can improve video encoding and decoding efficiency at least to a certain extent.

Other features and advantages of this application become obvious through the following detailed descriptions, or may be partially learned partially through the practice of this application.

According to an aspect of the embodiments of this application, a video decoding method is provided, including: obtaining an absolute value of a first direction component of a string vector difference through decoding from a bitstream; obtaining a sign value of the first direction component of the string vector difference through decoding from the bitstream, when the absolute value of the first direction component of the string vector difference is not 0; and determining a value of the first direction component of the string vector difference according to the absolute value of the first direction component of the string vector difference and the sign value of the first direction component of the string vector difference.

According to an aspect of the embodiments of this application, a video encoding method is provided, including: determining an absolute value of a first direction component of a string vector difference; obtaining a sign value of the first direction component of the string vector difference, when the absolute value of the first direction component of the string vector difference is not 0; and performing encoding according to the absolute value of the first direction component of the string vector difference and the sign value of the first direction component of the string vector difference.

According to an aspect of the embodiments of this application, a video decoding apparatus is provided, including: a first decoding unit, configured to obtain an absolute value of a first direction component of a string vector difference through decoding from a bitstream; a second decoding unit, configured to obtain a sign value of the first direction component of the string vector difference through decoding from the bitstream, when the absolute value of the first direction component of the string vector difference is not 0; and a first processing unit, configured to determine a value of the first direction component of the string vector difference according to the absolute value of the first direction component of the string vector difference and the sign value of the first direction component of the string vector difference.

According to an aspect of the embodiments of this application, a video encoding apparatus is provided, including: a first determining unit, configured to determine an absolute value of a first direction component of a string vector difference; a second determining unit, configured to obtain a sign value of the first direction component of the string vector difference, when the absolute value of the first direction component of the string vector difference is not 0; and an encoding unit, configured to perform encoding according to the absolute value of the first direction component of the string vector difference and the sign value of the first direction component of the string vector difference.

According to an aspect of the embodiments of this application, a non-transitory computer-readable medium is provided, storing a computer program, the computer program, when executed by a processor, implementing the method according to the foregoing embodiments.

According to an aspect of the embodiments of this application, an electronic device is provided, including: one or more processors; and a storage apparatus, configured to store one or more programs, the one or more programs, when executed by the one or more processors, causing the one or more processors to implement the method according to the foregoing embodiments.

According to an aspect of this application, a computer program product or a computer program is provided, the computer program product or the computer program including computer instructions, the computer instructions being stored in a computer-readable storage medium. A processor of a computer device reads the computer instructions from the computer-readable storage medium, and executes the computer instructions, so that the computer device performs the method provided in the various embodiments.

It is to be understood that the foregoing general descriptions and the following detailed descriptions are merely for illustration and explanation purposes and are not intended to limit this application.

DESCRIPTION OF EMBODIMENTS

Exemplary implementations are now described more comprehensively with reference to the accompanying drawings. However, the examples of implementations may be implemented in multiple forms, and it is not to be understood as being limited to the examples of implementations described herein. Conversely, the implementations are provided to make this application more comprehensive and complete, and comprehensively convey the idea of the examples of the implementations to a person skilled in the art.

In addition, the described features, structures, or characteristics may be combined in one or more embodiments in any appropriate manner. In the following descriptions, more specific details are provided to provide a comprehensive understanding of the embodiments of this application. However, a person skilled in the art is to be aware that, the technical solutions in this application may be implemented without one or more of the specific details, or another method, unit, apparatus, or step may be used. In other cases, well-known methods, apparatuses, implementations, or operations are not shown or described in detail, to avoid obscuring aspects of this application.

The block diagrams shown in the accompanying drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely examples for descriptions, do not need to include all content and operations/steps, and do not need to be performed in the described orders either. For example, some operations/steps may be further divided, while some operations/steps may be combined or partially combined. Therefore, an actual execution order may change according to an actual case.

A "plurality of" mentioned herein means two or more. And/or describes an association relationship for describing associated objects and represents that three relationships may exist. For example, A and/or B may represent the following three cases: only A exists, both A and B exist, and only B exists. The character "/" generally indicates an "or" relationship between the associated objects.

Figure 1:
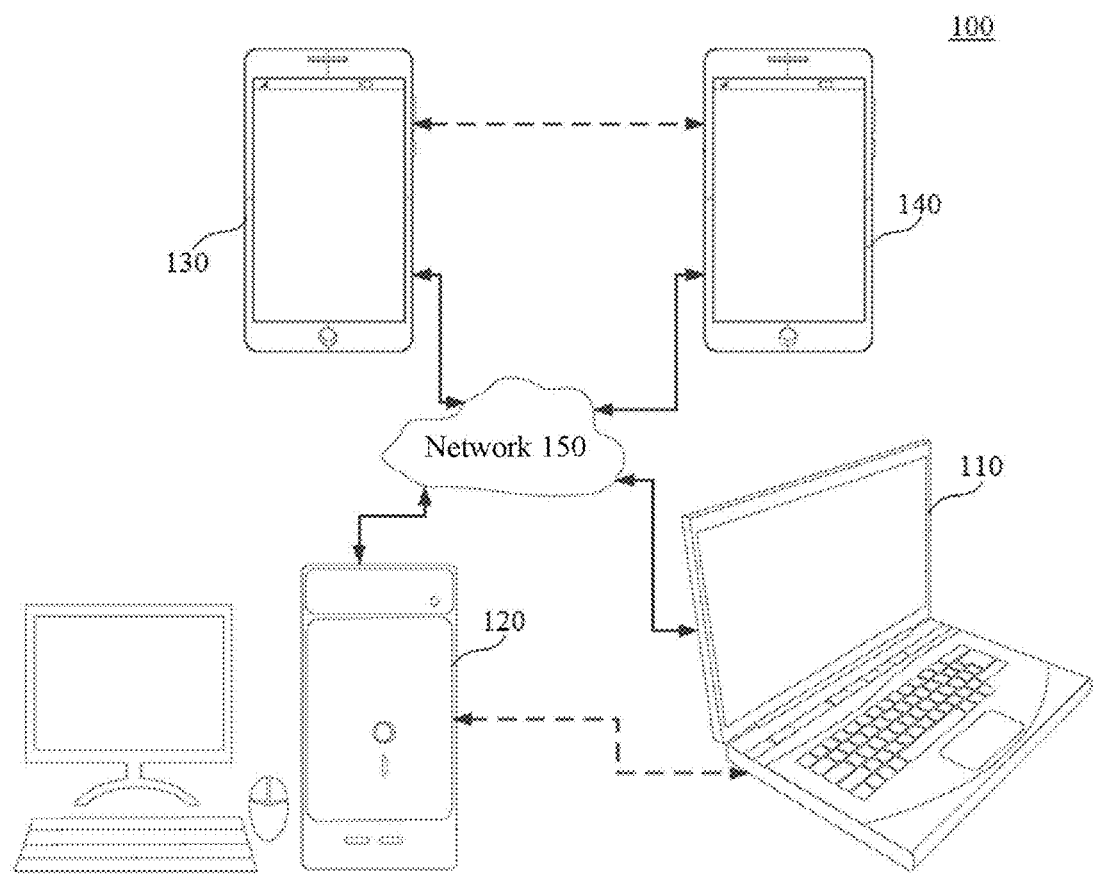
FIG. 1 is a schematic diagram of an exemplary system architecture to which a technical solution according to an embodiment of this application may be applied.

FIG. 1 is a schematic diagram of an exemplary system architecture to which a technical solution in an embodiment of this application is applicable.

As shown in FIG. 1, a system architecture 100 includes a plurality of terminal apparatuses. The terminal apparatuses can communicate with each other through a network 150, for example. For example, the system architecture 100 may include a first terminal apparatus 110 and a second terminal apparatus 120 connected through the network 150. In the embodiment of FIG. 1, the first terminal apparatus 110 and the second terminal apparatus 120 perform unidirectional data transmission.

For example, the first terminal apparatus 110 may code video data (for example, a video picture stream captured by the first terminal apparatus 110) and transmit the coded video data to the second terminal apparatus 120 through the network 150. The coded video data is transmitted in a form of one or more coded video bitstreams. The second terminal apparatus 120 may receive the coded video data through the network 150, decode the coded video data to recover the video data, and display a video picture according to the recovered video data.

In some embodiments of this application, the system architecture 100 may include a third terminal apparatus 130 and a fourth terminal apparatus 140 that perform bidirectional transmission of the coded video data. The bidirectional transmission may be performed, for example, during a video conference. During the bidirectional data transmission, one of the third terminal apparatus 130 and the fourth terminal apparatus 140 may code video data (for example, a video picture stream captured by the terminal apparatus) and transmit the coded video data to the other of the third terminal apparatus 130 and the fourth terminal apparatus 140 through the network 150. One of the third terminal apparatus 130 and the fourth terminal apparatus 140 may further receive coded video data transmitted by the other of the third terminal apparatus 130 and the fourth terminal apparatus 140, and may decode the coded video data to recover the video data and may display a video picture on an accessible display apparatus according to the recovered video data.

In the embodiment of FIG. 1, the first terminal apparatus 110, the second terminal apparatus 120, the third terminal apparatus 130, and the fourth terminal apparatus 140 may be servers, personal computers, or smart phones, but the principle disclosed in this application may not be limited thereto. The embodiments disclosed in this application are applicable to laptop computers, tablet computers, media players, and/or dedicated video conferencing devices. The network 150 represents any number of networks through which coded video data is transmitted among the first terminal apparatus 110, the second terminal apparatus 120, the third terminal apparatus 130, and the fourth terminal apparatus 140, for example, including a wired and/or wireless communication network. The communication network 150 may exchange data in a circuit switching channel and/or a packet switching channel. The network may include a telecommunication network, a local area network, a wide area network, and/or the Internet. For the purpose of this application, unless explained below, an architecture and a topology of the network 150 may be inessential to the operation disclosed in this application.

Figure 2:
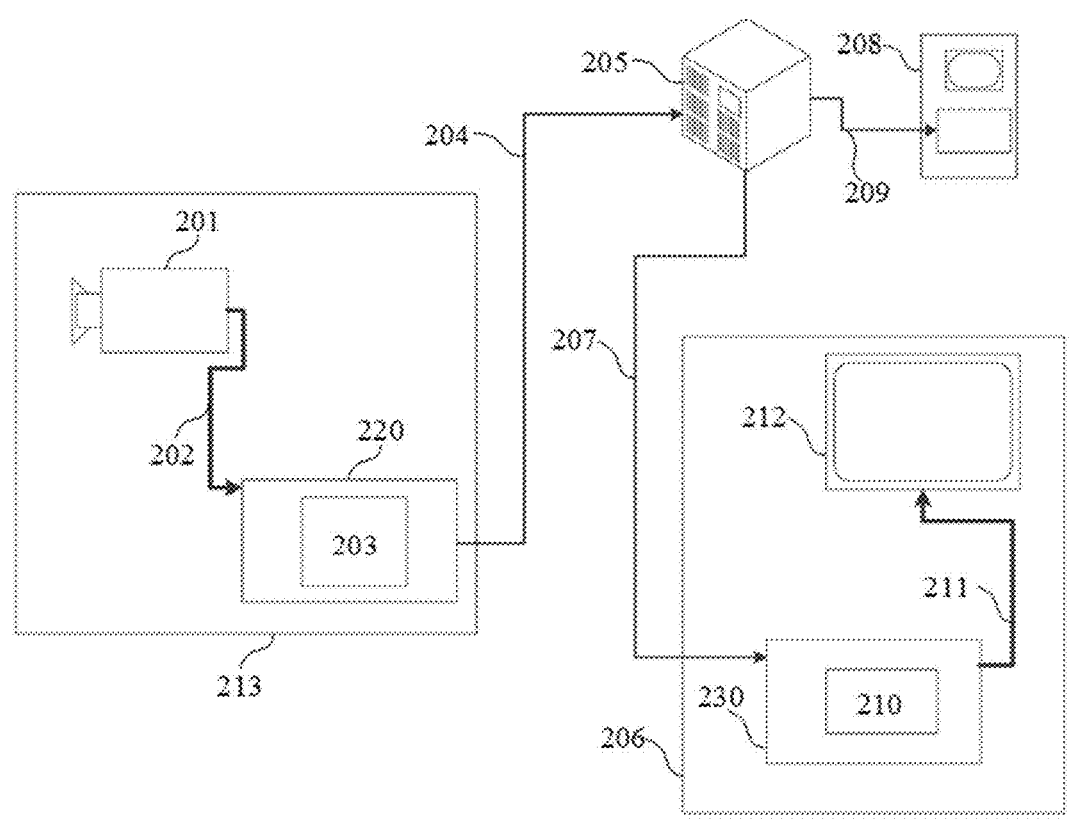
FIG. 2 is a schematic diagram of a placement manner of a video encoding apparatus and a video decoding apparatus in a streaming transmission system.

In some embodiments of this application, FIG. 2 shows a placement manner of a video encoding apparatus and a video decoding apparatus in a streaming transmission environment. The subject disclosed in this application may be comparably applicable to other video-enabled applications, including, for example, a video conference, a digital television (TV), and storage of compressed videos on digital media including a CD, a DVD, and a memory stick.

A streaming transmission system may include a capture subsystem 213. The capture subsystem 213 may include a video source 201 such as a digital camera. The video source creates an uncompressed video picture stream 202. In an embodiment, the video picture stream 202 includes a sample captured by the digital camera. Compared with the coded video data 204 (or a coded video bitstream 204), the video picture stream 202 is depicted by a thick line to emphasize the video picture stream with a large data volume. The video picture stream 202 may be processed by an electronic device 220. The electronic device 220 includes a video encoding apparatus 203 coupled to the video source 201. The video encoding apparatus 203 may include hardware, software, or a combination of hardware and software to realize or implement various aspects of the disclosed subject matter described in more detail below. Compared with the video picture stream 202, the coded video data 204 (or a coded video bitstream 204) is depicted by a thin line to emphasize the coded video data 204 with a small data volume (or a coded video bitstream 204), which may be stored on a streaming transmission server 205 for future use. One or more streaming transmission client subsystems, for example, a client subsystem 206 and a client subsystem 208 in FIG. 2, may access the streaming transmission server 205 to retrieve a copy 207 and a copy 209 of the coded video data 204. The client subsystem 206 may include, for example, a video decoding apparatus 210 in an electronic device 230. The video decoding apparatus 210 decodes an incoming copy 207 of the coded video data and generates an output video picture stream 211 that can be presented on a display 212 (such as a display screen) or another presence apparatus. In some streaming transmission systems, the coded video data 204, the video data 207, and the video data 209 (for example, the video bitstream) may be coded according to some video coding/compression standards.

The electronic device 220 and the electronic device 230 may include other components not shown in the figure. For example, the electronic device 220 may include a video decoding apparatus, and the electronic device 230 may further include a video encoding apparatus.

In some embodiments of this application, international video coding standards such as High Efficiency Video Coding (HEVC) and the Versatile Video Coding (VVC) and the Chinese national video coding standard such as the Audio Video coding Standard (AVS) are used as examples. When a video image frame is inputted, the video image frame is partitioned into a plurality of non-overlapping processing units according to a block size, and a similar compression operation is performed on each processing unit. The processing unit is referred to as a coding tree unit (CTU) or a largest coding unit (LCU). The CTU may be further partitioned more finely to obtain one or more basic coding units (CU). The CU is the most basic element in a coding process.

Some concepts during coding of the CU are described below.

Predictive coding: The predictive coding includes modes such as intra prediction and inter prediction. After an original video signal is predicted by using a selected reconstructed video signal, a difference video signal is obtained. An encoder side is required to select a predictive coding mode for a current CU and inform a decoder side. The intra prediction means that a predicted signal comes from a region that has been coded and reconstructed in a same image. The inter prediction means that the predicted signal comes from a coded image (referred to as a reference image) that is different from a current image.

Transform & quantization: Transform operations such as Discrete Fourier Transform (DFT) and Discrete Cosine Transform (DCT) are performed on a difference video signal to convert the signal into a transform domain, which is referred to as a conversion coefficient. A lossy quantization operation is further performed on the transform coefficient, which loses a specific amount of information, so that the quantized signal facilitates compressed expression. In some video coding standards, more than one transform mode may be selected. Therefore, the encoder side is also required to select one transform mode for the current CU and inform the decoder side. Fineness of the quantization is generally determined by a quantization parameter (QP). A larger QP indicates that coefficients with a larger value range are to be quantized into a same output, which usually brings greater distortion and a lower bit rate. On the contrary, a smaller QP indicates that coefficients within a smaller value range are to be quantized into a same output, which generally brings less distortion and a higher bit rate.

Entropy coding or statistical coding: Statistical compression coding is performed on the quantized signal in the transform domain according to a frequency of occurrence of each value, and finally a binarized (0 or 1) compressed bitstream is outputted. In addition, entropy coding is also required to be performed on other information generated during the coding, such as the selected coding mode and motion vector data, to reduce a bit rate. Statistical coding is a lossless coding manner that can effectively reduce a bit rate required for expressing a same signal. A common statistical coding mode includes variable length coding (VLC for short) or context adaptive binary arithmetic coding (CABAC for short).

A context adaptive binary arithmetic coding (CABAC) process mainly includes three steps: binarization, context modeling, and binary arithmetic coding. After binarization of inputted syntax elements, the binary data may be encoded by a conventional encoding mode and a bypass coding mode. The bypass coding mode does not require the assignment of a specific probability model to each binary bit bin, and an inputted binary bit bin value is directly encoded using a simple bypass encoder to speed up the entire encoding and decoding process. In general, different syntax elements are not completely independent, and the same syntax elements themselves have a certain memory. Thus, according to the conditional entropy theory, using other coded syntax elements for conditional coding can further improve the coding performance compared with independent coding or memoryless coding. Encoded symbolic information that is used as a condition is referred to as a context. In the conventional encoding mode, binary bit bins of syntax elements enter a context modeler sequentially. The encoder allocates a suitable probability model for each inputted binary bit bin based on a value of a previously encoded syntax element or binary bit. This process is referred to as context modeling. A context model corresponding to a syntax element can be located via ctxIdxInc (context index increment) and ctxIdxStart (context index start). After feeding the bin value and the allocated probability model together into a binary arithmetic encoder for encoding, the context model needs to be updated according to the bin value. This is an adaptive process in the encoding.

Loop filtering: Operations such as inverse quantization, inverse transform, and predictive compensation are performed on a transformed and quantized signal to obtain a reconstructed image. The reconstructed image has some information different from that in an original image as a result of quantization, that is, the reconstructed image may cause distortion. Therefore, a filtering operation may be performed on the reconstructed image, for example, by using filters such as a deblocking filter (DB), a sample adaptive offset (SAO) filter, or an adaptive loop filter (ALF), which can effectively reduce a degree of distortion caused by quantization. Since the filtered reconstructed images are to be used as a reference for subsequently coded images to predict future image signals, the foregoing filtering operation is also referred to as loop filtering, that is, a filtering operation in a coding loop.

Figure 3:
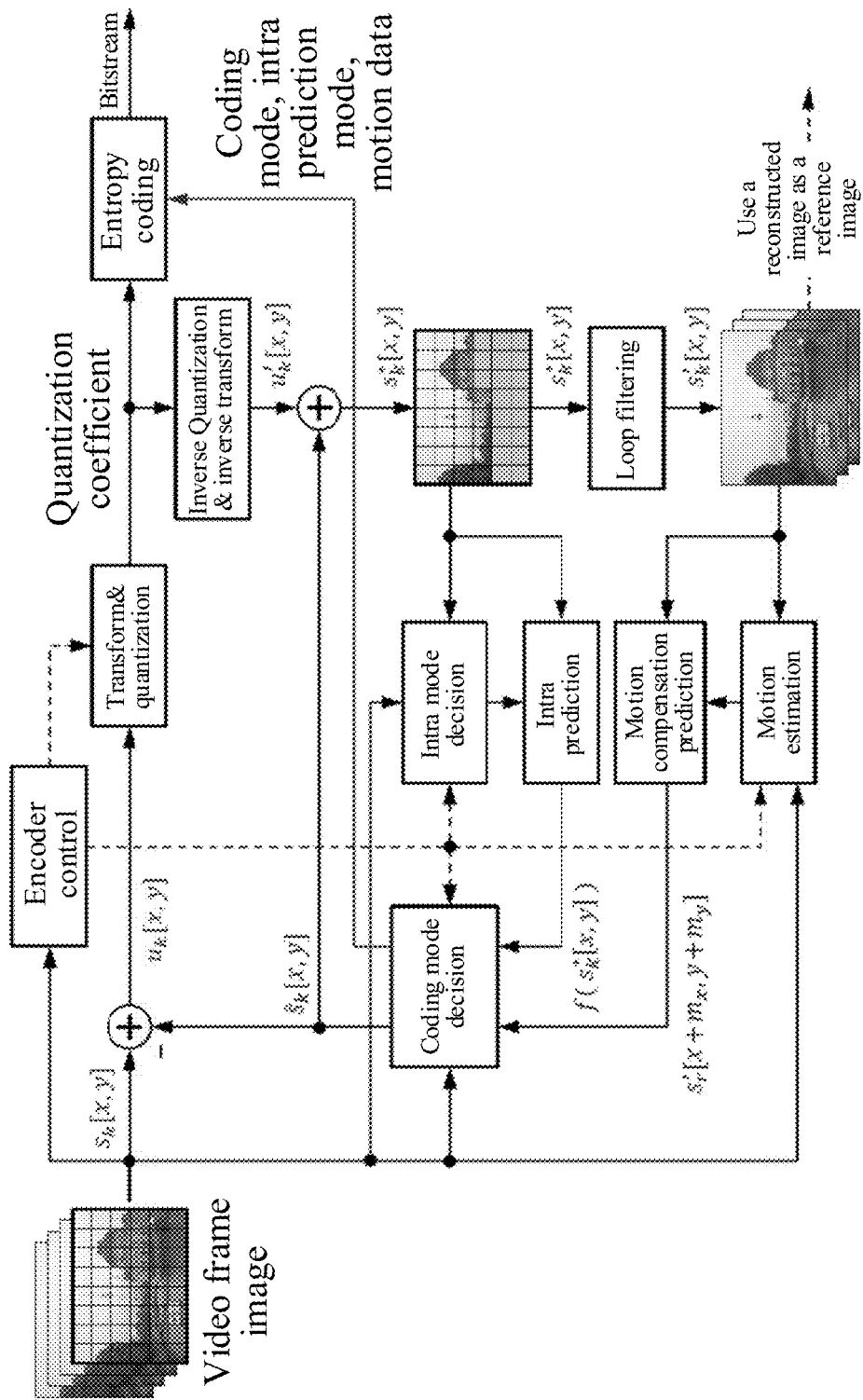
FIG. 3 is a basic flowchart of a video coder.

In some embodiments of this application, FIG. 3 is a basic flowchart of a video encoder. In this process, intra prediction is used as an example for description. A difference between an original image signal $s_k[x, y]$ and a predicted image signal $\hat{s}_k[x, y]$ is calculated to obtain a difference signal $u_k[x, y]$, and the difference signal $u_k[x, y]$ is transformed and quantized to obtain a quantization coefficient. The quantization coefficient is subjected to entropy coding to obtain a coded bitstream, and is further subjected to inverse quantization and inverse transform to obtain a reconstructed difference signal $u'_k[x, y]$. The predicted image signal $\hat{s}_k[x, y]$ is superimposed with the reconstructed difference signal $u'_k[x, y]$ to generate an image signal $s*_k[x, y]$. The image signal $s*_k[x, y]$ is inputted to an intra mode decision module and an intra prediction module for intra prediction, and is further subjected to loop filtering to output a reconstructed image signal $s'_k[x, y]$. The reconstructed image signal $s'_k[x, y]$ 0 may be used as a reference image for a next frame for motion estimation and motion compensation prediction. Then a predicted image signal $\hat{s}'_k[x, y]$ of the next frame is obtained based on a result $s'_r[x+m_x, y+m_y]$ of the motion compensation prediction and a result $f(s*_k[x, y])$ of the intra prediction. The above process is repeated until the encoding is completed.

Based on the foregoing coding process, on the decoder side, for each CU, after a compressed bitstream is acquired, entropy decoding is performed to obtain various mode information and quantization coefficients, and the quantization coefficients are inversely quantized and inversely transformed to obtain difference signals. Moreover, a predicted signal corresponding to the CU can be obtained according to coding mode information that is known. Then the difference signal may be added to the predicted signal to obtain a reconstructed signal. The reconstructed signal is then subjected to operations such as loop filtering to generate a final output signal.

In current mainstream video encoding standards (such as HEVC, VVC, and AVS3), a block-based hybrid coding framework is used. In the standards, specifically, original video data is divided into a series of coding blocks, and the video data is compressed in combination with video encoding methods such as predictive, transform, and entropy coding. Motion compensation is a prediction method commonly used in video encoding, and the motion compensation exports a prediction value of a current coding block from an encoded region based on redundant characteristics of video content in a time domain or space domain. Such prediction method includes: inter prediction, intra block copy prediction, and intra string copy prediction. In a specific encoding implementation, the prediction methods may be used independently or in combination. For a coding block to which the prediction methods are applied, one or more two-dimensional vectors generally need to be explicitly or implicitly encoded in a bitstream, to indicate displacements of one or more reference blocks of a current block (or a collocated block of the current block).

In different prediction modes and different implementations, the displacement vector may have different names, and the displacement vector in the embodiments of this application is uniformly described in the following manners: 1) a displacement vector in the inter prediction is referred to as a motion vector (MV); (2) a displacement vector in intra block copy (IBC) is referred to as a block vector (BV); and (3) a displacement vector in intra string copy (ISC) is referred to as a string vector (SV).

Figure 4:
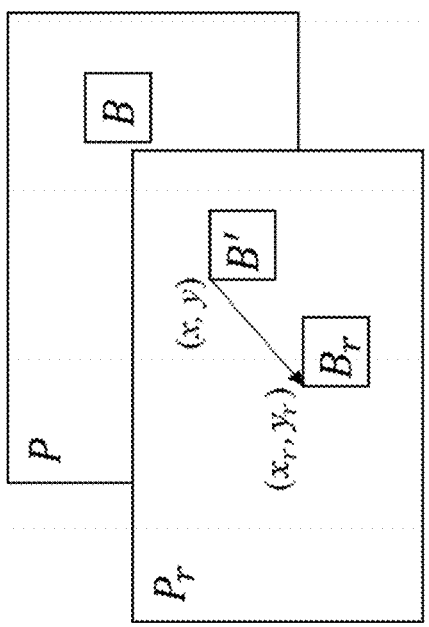
FIG. 4 is a schematic diagram of inter prediction.

As shown in FIG. 4, the inter prediction is to predict a pixel of the current picture by using correlation of a time domain of a video and using a pixel of an adjacent encoded picture, so that the time domain redundancy of the video is effectively removed, thereby effectively saving bits for encoding difference data. P represents a current frame, Pr represents a reference frame, B represents a current coding block, and Br represents a reference block of B. The coordinates of B' in the reference frame are the same as the coordinates of B in the current frame, the coordinates of Br are (xr, yr), the coordinates of B' are (x, y), and the displacement between the current coding block and the reference block thereof is referred to as a motion vector (MV), where MV=(xr−x, yr−y).

Considering that time domain or space domain adjacent blocks have relatively strong correlation, an MV prediction technology may be used to further reduce bits required for encoding the MV. In H.265/HFVC, the inter prediction mode includes two MV prediction technologies: a Merge mode and an advanced motion vector prediction (AMVP) mode. The Merge mode may establish a candidate MV list for a current prediction unit (PU), where there are 5 candidate MVs (and corresponding reference images) in the list. The 5 candidate MVs are traversed, and a candidate MV with minimum rate-distortion cost is selected as an optimal MV. If an encoder establishes a candidate list in the same manner, the encoder only needs to transmit an index of the optimal MV in the candidate list. The MV prediction technology of HEVC also has a skip mode, which is a special case of the Merge mode. After the optimal MV is found in the Merge mode, when the current block and the reference block are basically the same, difference data does not need to be transmitted, and only the index of the optimal MV and a skip flag need to be transmitted.

Figure 5:
FIG. 5 is a schematic diagram of determining a candidate MV.

The MV candidate list established in the Merge mode includes two cases including a space domain and a time domain, and further includes a combined list for a B slice. The space domain provides up to 4 candidate MVs, which are established as shown in FIG. 5(a). The space domain list is established according to a sequence A1→B1→B0→A0→B2, where B2 is a substitute. That is, when one or more of A1, B1, B0, and A0 does not exist, motion information of B2 needs to be used. The time domain only provides 1 candidate MV at most, and an establishment process is shown by (b) in FIG. 5 and is obtained through expansion of an MV of a collocated block according to the following formula:

$$curMV = \frac{td}{tb} \times colMV$$

where curMV and colMV respectively represent MVs of the current block and the collocated block, and td and tb represent distances between the current image and the reference image thereof and the collocated image and the reference image thereof respectively. If a PU at a position D0 on a collocated block is unavailable, a collocated PU at a position D1 is used for replacement. For a PU in the B Slice, because the PU includes two MVs, an MV candidate list thereof also needs to provide two MVPs. The HEVC combines first 4 candidate MVs in the MV candidate list in pairs, to generate a combined list for the B Slice.

Similarly, an AMVP mode is to first establish a candidate prediction MV list for a current PU by using correlation between MVs of adjacent blocks in space domain and time domain. Different from the Merge mode, an optimal prediction MV is selected in the candidate prediction MV list of the AMVP mode, and differential encoding is performed on the optimal prediction MV and an optimal MV obtained by the current coding block through motion searching, that is, encoding is performed on MVD=MV−MVP. By establishing the same list, the decoder side only needs the serial numbers of the motion vector difference (MVD) and the motion vector predictor (MVP) in the list for calculating the MV of the current coding block. The candidate MV list of the AMVP also includes two cases of a space domain and a time domain, and a difference lies in that a length of the AMVP list is only 2.

History based motion vector prediction (HMVP) is a newly adopted MV prediction technology in H.266/VVC. HMVP is a motion vector prediction method based on historical information, and motion information of a historical coding block is stored in an HMVP list and is used as an MVP of a current CU. H.266/VVC adds HMVP to the candidate list of the Merge mode, which ranks after time domain and space domain MVPs. HMVP technology stores motion information of previously coding blocks in a First Input First Output (FIFO) queue. If stored prediction candidate information and motion information that is just encoded are the same, the repeated candidate information is first removed, and all HMVP candidate information moves forward, and the motion information of the current CU is added to an end of the FIFO queue. If the motion information of the current CU is different from any candidate motion information in the FIFO queue, the latest motion information is added to the end of the FIFO queue. When new motion information is added to the HMVP list, when the list has reached the maximum length, the first candidate information in the FIFO queue is removed, and the latest motion information is then added to the end of the FIFO queue. The HMVP list may be reset (emptied) in a case of encountering a new CTU row. In H.266/VVC, a size of an HMVP list is set to 6, to reduce a number of redundancy checking operations, and the following simplification policies are introduced:

1. A quantity of HMVP candidates used for generating a Merge list is set to (N<=4), M: (8−N), where N represents a quantity of existing candidates in the Merge list, and M represents a quantity of available HMVP candidates in the Merge list.

2. Once a length of the available Merge list reaches a maximum allowed length minus 1, a construction process of a Merge candidate list of the HMVP is ended.

Figure 6:
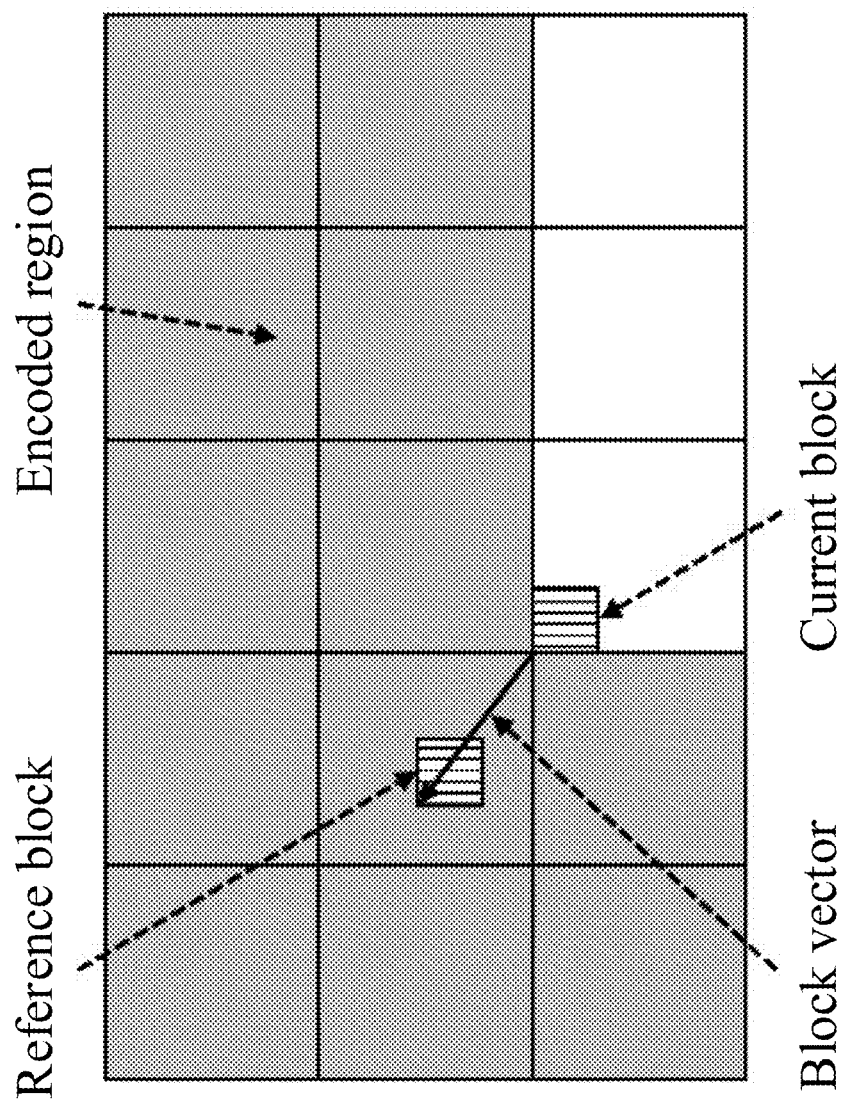
FIG. 6 is a schematic diagram of intra block copy.

Intra block copy (IBC) is an encoding tool adopted in screen content coding (SCC) expansion of HEVC, which significantly improves the efficiency of SCC. In AVS3 and VVC, IBC technology is also adopted to improve the performance of screen content coding. The IBC is to predict a pixel of a current to-be-encoded block by using correlation of a screen content video in a space and using a pixel in an encoded image on a current image, which can effectively reduce bits required for encoding the pixel. As shown in FIG. 6, a displacement between a current block and a reference block thereof in the IBC is referred to as a block vector (BV). In the H.266/VVC standard, a BV technology similar to the inter prediction is adopted, to further reduce bits required for encoding the BV.

Figure 7:
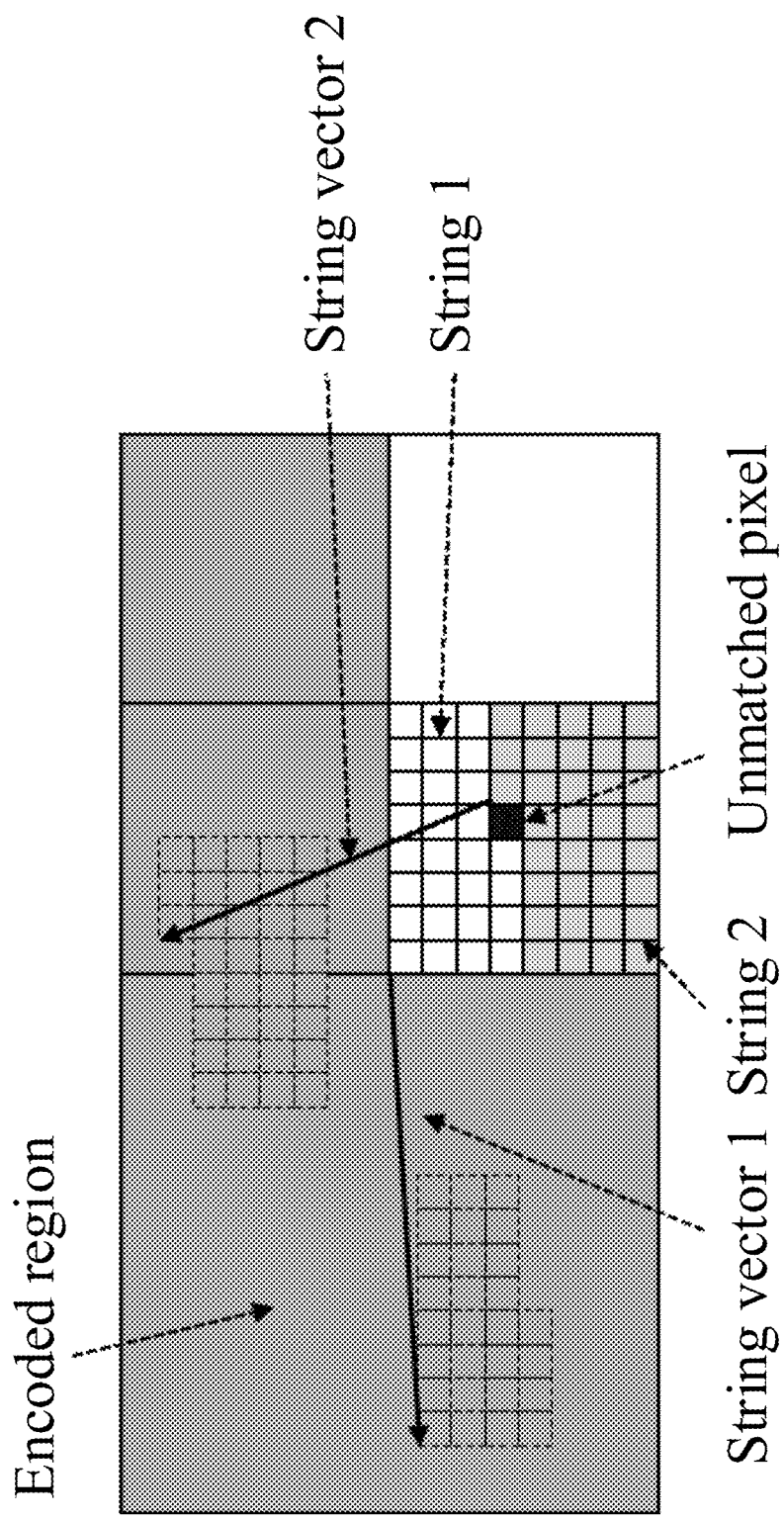
FIG. 7 is a schematic diagram of intra string copy.

The intra string copy technology divides a coding block into a series of pixel strings or unmatched pixels according to a scanning sequence (raster scanning, reciprocating scanning, and Zig-Zag scanning). Similar to the IBC technology, a reference string in a same shape is searched in an encoded region of the current picture for each string, a prediction value of a current string is exported, and encoding is performed on a difference between a pixel value and the prediction value of the current string instead of being directly performed on the pixel value, so that bits can be effectively saved. FIG. 7 is a schematic diagram of intra string copy, where dark gray regions are encoded regions, 28 white pixels are a string 1, 35 light gray pixels are a string 2, 1 black pixel represents an unmatched pixel, a displacement from the string 1 to a matched encoded string in the encoded region is referred to as a string vector 1, and a displacement from the string 2 to a matched encoded string in the encoded region is referred to as a string vector 2.

The intra string copy technology needs to encode a string vector (SV), a string length, and an identifier whether there is a matched string corresponding to each string in the current coding block. The SV represents a displacement from a to-be-encoded string to a reference string thereof, and the string length represents a quantity of pixels included in the string. In different implementations, encoding on the string length have many manners, and some examples (a part of the examples may be combined for use) are given below: 1) encoding is directly performed on the string length in a bitstream; (2) a quantity of to-be-processed pixels after the string is processed through encoding in the bitstream, and the decoder side performs decoding according to a size N of a current block and a quantity N1 of processed pixels, to obtain a quantity N2 of to-be-processed pixels, and obtains a length of the current string through calculation, that is, L=N−N1−N2; and (3) a flag is encoded to indicate whether the string is a last string in a bitstream, and if the string is the last string, the length L of the current string is obtained through calculation according to the size N of the current block and the quantity N1 of processed pixels, that is, L=N−N1. If a corresponding reference is not found in a reference region for a pixel, encoding is directly performed on a pixel value of the unmatched pixel.

Intra block copy (IBC) and intra string copy (ISC) are two SCC tools in AVS3, which both use the current picture as a reference to export a prediction value of a CU through motion compensation. Considering that IBC and ISC include similar reference regions, and block vector (BV) and string vector (SV) include relatively high correlation, prediction between IBC and ISC may be allowed to further improve the encoding efficiency. In the related art, an intra history based motion vector prediction (IntraHMVP) list that is similar to HMVP is used to record vector information, position information, size information, and repetition times of the two types of coding blocks, and export a block vector predictor (BVP) and a string vector predictor (SVP) through the IntraHMVP list.

In the related art, a method referred to as class based block vector prediction (CBVP) is used to export a BVP, which classifies candidate BVs in IntraHMVP list according to the following conditions:

class 0: an area of the historical coding block is greater than or equal to 64 pixels;

class 1: a frequency of the BV is greater than or equal to 2;

class 2: coordinates of an upper left corner of the historical coding block is on the left of coordinates of an upper left corner of the current block;

class 3: the coordinates of the upper left corner of the historical coding block is above the coordinates of the upper left corner of the current block;

class 4: the coordinates of the upper left corner of the historical coding block is on an upper left side of the coordinates of the upper left corner of the current block;

class 5: the coordinates of the upper left corner of the historical coding block is on an upper right side of the coordinates of the upper left corner of the current block; and class 6: the coordinates of the upper left corner of the historical coding block is on a lower left side of the coordinates of the upper left corner of the current block.

Instances in each class are arranged in a reverse sequence of an encoding sequence (that is, the closer to the current block in the encoding sequence, the former the instance is ranked), a BV corresponding to a first historical coding block is a candidate BV corresponding to the class, and a candidate BV is then added to a CBVP list corresponding to each class in an order of class 0 to class 6. When a new BV is added to the CBVP list, whether a repeated BV already exists in the CBVP list needs to be checked, and the BV is added to the CBVP list only if there is no repeated BV. The encoder side selects an optimal candidate BV in the CBVP list as a BVP, and encodes an index in a bitstream to represent an index of a class corresponding to the optimal candidate BV in the CBVP list, and the decoder side decodes the BVP from the CBVP list according to the index.

After the current PU is decoded, when a prediction type of the current PU is block copy intra prediction, when NumOfIntraHmvpCand (a quantity of pieces of motion information in a history based motion information list) is greater than 0, the IntraHMVP is updated according to the motion information of the block copy intra prediction of a current prediction block in a method described in the following embodiments. The intra prediction motion information of the current prediction block includes vector information, position information, size information, and repetition times, where the vector information of the block copy intra prediction block is a block vector (BV); the position information includes a horizontal coordinate and a vertical coordinate of an upper left corner of the current prediction block; the size information is a product of a width and a height; and the repetition times of the current prediction block is initialized to 0.

In addition, in the related art, an index is encoded for each string in an ISC coding block, to indicate a position of an SVP of the string in the IntraHMVP list. Similar to the skip mode in intra prediction, an SV of a current string is equal to an SVP, and a difference SVD between the SV and the SVP does not need to be encoded.

After the current PU is decoded, when a prediction type of the current PU is string copy intra prediction, when NumOfIntraHmvpCand is greater than 0, the IntraHMVP is updated according to the motion information of the intra prediction of the current prediction block in a method described in the following embodiments. The motion information of the intra prediction of the current prediction block includes vector information, position information, size information, and repetition times, where the vector information of a current string is an SV; the position information includes a horizontal coordinate and a vertical coordinate of a first pixel sample of the string; the size information is a string length of the part; and the repetition times is initialized to 0.

The following describes an update process of intra history based motion vector prediction (IntraHMVP) list. The intra prediction motion information includes vector information, position information, size information, and repetition times. After the current PU is decoded, when a prediction type of the current PU is block copy intra prediction or string copy intra prediction, and NumOfIntraHmvpCand is greater than 0, the intra history based motion vector prediction list IntraHmvpCandidateList is updated according to the motion information of the intra prediction of the current prediction block. Assuming that the vector information, position information, size information, and repetition times of IntraHmvpCandidateList[X] are respectively recorded as intraMvCandX, posCandX, sizeCandX, and cntCandX, the following process is performed:

Step 101: X is initialized to 0, and cntCur is initialized to 0.

Step 102: When CntIntraHmvp=0, IntraHmvpCandidateList[CntInraHmvp] is the intra prediction motion information of the current PU, and CntIntraHmvp is increased by 1.

Step 103: When CntIntraHmvp≠0, whether the intra prediction motion information of the current prediction block is equal to IntraHmvpCandidateList[X] is determined according to whether intraMvCur is equal to intraMvCandX:

Step 1031: When intraMvCur is equal to intraMvCandX, step 104 is performed, or otherwise, X is increased by 1.

Step 1032: When X is less than CntIntraHmvp, step 103 is performed; or otherwise, step 105 is performed.

Step 104: A value of cntCur is equal to a value obtained by increasing a value of cntCandX by 1. If sizeCur is less than sizeCandX, sizeCur is equal to sizeCandX respectively at present.

Step 105: When X is less than CntIntraHmvp:

Step 1051: i ranges from X to CntIntraHmvp−1, to cause IntraHmvpCandidateList[i] to be equal to IntraHmvpCandidateList[i+1]; and Step 1052: IntraHmvpCandidateList[CntIntraHmvp−1] is equal to the intra prediction motion information of the current PU.

Step 106: When X is equal to CntIntraHmvp, and CntIntraHmvp is equal to NumOfIntraHmvpCand:

Step 1061: i ranges from 0 to CntIntraHmvp−1, to cause IntraHmvpCandidateList[i] to be equal to IntraHmvpCandidateList[i+1]; and Step 1062: IntraHmvpCandidateList[CntIntraHmvp−1] is equal to the intra prediction motion information of the current PU.

Step 107: When X is equal to CntIntraHmvp, and CntIntraHmvp is less than NumOfIntraHmvpCand, IntraHmvpCandidateList[CntIntraHmvp] is equal to the intra prediction motion information of the current PU, and CntIntraHmvp is increased by 1.

The following describes the decoding process of the string vector (SV), taking the horizontal direction as an example, referring to Table 1, the main process of SV (IscSvX, and IscSvY) decoding is as follows (bold and underlined fields in Table 1 represent syntax elements that need to be decoded, capitalized fields without underlines represent variables, and values of the variables may be obtained by decoding the syntax elements):

Step 201: A flag isc_sv_above_flag above a string vector is decoded, and when a value of isc_sv_above_flag is 1, a value of IscSvX is 0, and a value of IscSvY is −1.

Step 202: When the value of isc_sv_above_flag is 0, a string vector historical flag isc_sv_recent_flag is decoded. When a value of isc_sv_recent_flag is 1, a string vector historical index isc_sv_recent_index continues to be decoded, and according to a value of isc_sv_recent_index, in combination with the intra history based motion vector prediction list, values of IscSvX and IscSvY are obtained by looking up the list.

Step 203: When the value of isc_sv_recent_flag is 0, an SV is obtained by decoding according to the following steps:

Step 2031: A string vector Y component flag isc_sv_y_non_zero_flag is decoded.

Step 2032: When a value of isc_sv_y_non_zero_flag is 0, that is, the value of IscSvY is 0, IscSvx is obtained by decoding according to the following steps:

(1) If a value of IsOddRow is 1, that is, a row in which a current string is located is an odd row (a start row is a 0th row), then a string vector X component sign bit isc_sv_x_sign is decoded to obtain a value of isc_sv_x_sign; if the value of isc_sv_x_sign is 1, that is, the value of IscSvx is less than 0; and if the value of isc_sv_x_sign is 0, that is, the value of IscSvx is greater than 0.

(2) If the value of IsOddRow is 0, then the value of isc_sv_x_sign is 1, that is, the value of IscSvx is less than 0.

(3) A string vector X component absolute value isc_sv_x_abs_minus1 is decoded and deduced according to the method of 3-order exponential Golomb code, then a value of IscSvXAbs is equal to isc_sv_x_abs_minus1+1, and the value of IscSvX can be obtained in combination with the value of isc_sv_x_sign.

Step 2033: When the value of isc_sv_y_non_zero_flag is 1, that is, the value of IscSvY is not 0, IscSvy and IscSvx are obtained by sequentially decoding according to the following steps:

(1) A string vector Y component sign bit isc_sv_y_sign is decoded to obtain a value of isc_sv_y_sign; if the value of isc_sv_y_sign is 1, that is, the value of IscSvy is less than 0; and if the value of isc_sv_y_sign is 0, that is, the value of IscSvy is greater than 0.

(2) A string vector Y component absolute value isc_sv_y_abs_minus1 is decoded and deduced according to the method of 3-order exponential Golomb code, then a value of IscSvYAbs is equal to isc_sv_y_abs_minus1+1, and the value of IscSvY can be obtained in combination with the value of isc_sv_y_sign.

(3) If the value of isc_sv_y_sign is 0, that is, the value of IscSvy is greater than 0, the string vector X component absolute value isc_sv_x_abs_minus1 is decoded and deduced according to the method of 3-order exponential Golomb code, then the value of IscSvXAbs is equal to isc_sv_x_abs_minus1+1+SvOffset, and the value of isc_sv_x_sign is directly set to 1, that is, the value of IscSvX is less than 0. In combination with the value of isc_sv_x_sign, the value of IscSvX can be obtained. A value of SvOffset is obtained by an algorithm defined in AVS standard, and details are not described herein again.

(4) If the value of isc_sv_y_sign is 1, that is, the value of IscSvy is less than 0, the string vector X component flag isc_sv_x_non_zero_flag is decoded. If the value of isc_sv_x_non_zero_flag is 0, that is, the value of IscSvX is 0.

(5) If the value of isc_sv_x_non_zero_flag is 1, the value of IscSvX is not 0. Then, the string vector X component sign bit isc_sv_x_sign is decoded to obtain the value of isc_sv_x_sign; if the value of isc_sv_x_sign is 1, that is, the value of IscSvx is less than 0; and if the value of isc_sv_x_sign is 0, that is, the value of IscSvx is greater than 0.

(6) The string vector X component absolute value isc_sv_x_abs_minus1 is decoded and deduced according to the method of 3-order exponential Golomb code, then the value of IscSvXAbs is equal to isc_sv_x_abs_minus1+1, and the value of IscSvX can be obtained in combination with the value of isc_sv_x_sign.

TABLE 1

```
isc_sv_above_flag[i]
if (! IscSvAboveFlag) {
    isc_sv_recent_flag[i]
    if (IscSvRecentFlag) {
        isc_sv_recent_index[i]
    }
    else {
        IsOddRow = StrYInCu & 0x1
        SvOffset = StrXInCu
        if (IsOddRow) {
            SvOffset += 1
        }
        else {
            SvOffset += StrLen[i]
        }
        SvOffset = min(width, SvOffset)
        SvOffset --
        isc_sv_y_non_zero_flag[i]
        if (! IscSvYNonZeroFlag[i]) {
            if (IsOddRow) {
                isc_sv_x_sign[i]
            }
            isc_sv_x_abs_minus1[i]
        }
        else {
            isc_sv_y_sign[i]
            isc_sv_y_abs_minus1[i]
            if (! IscSvYSign[i]) {
                isc_sv_x_abs_minus1[i]
                IscSvXAbs[i] += SvOffset
            }
            else {
                isc_sv_x_non_zero_flag[i]
                if (IscSvXNonZeroFlag[i]) {
                    isc_sv_x_sign[i]
                    isc_sv_x_abs_minus1[i]
                }
            }
        }
    }
}
```

In Table 1, a value of a string vector above flag isc_sv_above_flag[i] is "1", indicating that a string vector of an i-th part of a current coding unit is (0,−1); and a value of "0" indicates that the string vector is not (0,−1). In addition, IscSvAboveFlag[i] is equal to the value of isc_sv_above_flag[i].

A value of a string vector historical flag isc_sv_recent_flag[i] is "1", indicating that the string vector of the i-th part of the current coding unit is to be exported from an intra copy history based information list; and a value of "0" indicates that the string vector is not to be exported from the intra copy history based information list. In addition, IscSvRecentFlag[i] is equal to the value of isc_sv_recent_flag[i]. If isc_sv_recent_flag[i] does not exist in a bitstream, then a value of IscSvRecentFlag[i] is 0.

If the values of IscSvAboveFlag[i] and IscSvRecentFlag[i] are both 0, then a value of a string vector X component of the i-th part of the current coding unit is determined by IscSvXNonZeroFlag[i], IscSvXSign[i], and IscSvXAbs[i], and a value of a Y component is determined by IscSvYNonZeroFlag[i], IscSvYSign[i], and IscSvYAbs[i].

A string vector historical index isc_sv_recent_index[i] represents an index value of the string vector of the i-th part of the current coding unit in the intra copy history based information list. A value of IscSvRecentIndex[i] is equal to a value of isc_sv_recent_index[i].

A value of a string vector X component flag isc_sv_x_non_zero_flag[i] is "1", indicating that a value of an X component of the string vector of the i-th part of the current coding unit is not equal to 0; and a value of "0" indicates that the value of the X component is equal to 0. In addition, IscSvXNonZeroFlag[i] is equal to the value of isc_sv_x_non_zero_flag[i]. A value of IscSvXNonZeroFlag [i] is 1 if isc_sv_x_non_zero_flag[i] does not exist in the bitstream.

A value of a string vector Y component flag isc_sv_y_non_zero_flag[i] is "1", indicating that the value of the Y component of the string vector of the i-th part of the current coding unit is not equal to 0; and a value of "0" indicates that the value of the Y component is equal to 0. In addition, IscSvYNonZeroFlag[i] is equal to the value of isc_sv_y_non_zero_flag [i]. A value of IscSvYNonZeroFlag [i] is 1 if isc_sv_y_non_zero_flag [i] does not exist in the bitstream.

A string vector X component sign bit isc_sv_x_sign[i] represents a sign bit of the X component of the string vector of the i-th part of the current coding unit. In addition, IscSvXSign[i] is equal to a value of isc_sv_x_sign [i]. A value of IscSvXSign[i] is 1 if isc_sv_x_sign[i] does not exist in the bitstream.

A string vector Y component sign bit isc_sv_y_sign[i] represents a sign bit of the Y component of the string vector of the i-th part of the current coding unit. In addition, IscSvYSign [i] is equal to a value of isc_sv_y_sign [i]. A value of IscSvYSign[i] is 1 if isc_sv_y_sign [i] does not exist in the bitstream.

A string vector X component absolute value isc_sv_x_abs_minus1[i] represents an absolute value of the X component of the string vector of the i-th part of the current coding unit minus 1. In addition, IscSvXAbs[i] is equal to a value of isc_sv_x_abs_minus1[i] plus 1.

A string vector Y component absolute value isc_sv_y_abs_minus1[i] represents an absolute value of the Y component of the string vector of the i-th part of the current coding unit minus 1. In addition, IscSvYAbs[i] is equal to a value of isc_sv_y_abs_minus1[i] plus 1.

In addition, in the methods described above, the inverse binarization processing of isc_sv_x_abs_minus1 and isc_sv_y_abs_minus1 may be specifically implemented by querying a corresponding synElVal value in Table 2 below after a binary symbol string is parsed. In Table 2, the binary symbol string is 3-order exponential Golomb code corresponding to the value of synElVal.

TABLE 2

| Value of synElVal | Binary symbol string | | | | | | | | | |
|---|---|---|---|---|---|---|---|---|---|---|
| 0 | 1 | 0 | 0 | 0 | | | | | | |
| 1 | 1 | 0 | 0 | 1 | | | | | | |
| 2 | 1 | 0 | 1 | 0 | | | | | | |
| 3 | 1 | 0 | 1 | 1 | | | | | | |
| 4 | 1 | 1 | 0 | 0 | | | | | | |
| 5 | 1 | 1 | 0 | 1 | | | | | | |
| 6 | 1 | 1 | 1 | 0 | | | | | | |

TABLE 2-continued

| Value of synElVal | Binary symbol string | | | | | | | | | |
|---|---|---|---|---|---|---|---|---|---|---|
| 7 | 1 | 1 | 1 | 1 | | | | | | |
| 8 | 0 | 1 | 0 | 0 | 0 | 0 | | | | |
| 9 | 0 | 1 | 0 | 0 | 0 | 1 | | | | |
| 10 | 0 | 1 | 0 | 0 | 1 | 0 | | | | |
| 11 | 0 | 1 | 0 | 0 | 1 | 1 | | | | |
| 12 | 0 | 1 | 0 | 1 | 0 | 0 | | | | |
| 13 | 0 | 1 | 0 | 1 | 0 | 1 | | | | |
| 14 | 0 | 1 | 0 | 1 | 1 | 0 | | | | |
| 15 | 0 | 1 | 0 | 1 | 1 | 1 | | | | |
| 16 | 0 | 1 | 1 | 0 | 0 | 0 | | | | |
| ... | | | | | | | | | | |
| binIdx | 0 | 1 | 2 | 3 | 4 | 5 | 6 | 7 | 8 | 9 ... |

The following describes a decoding process of a block vector difference (BVD). Referring to Table 3, a main process of BVD decoding is as follows (bold and underlined fields in Table 3 represent syntax elements that need to be decoded, capitalized fields without underlines represent variables, and values of the variables may be obtained by decoding the syntax elements):

Step 301: A motion vector difference horizontal direction absolute value mv_diff_x_abs_bv is deduced after decoding from a bitstream, which specifically includes:

(1) A prefix value mv_diff_x_abs_bv_pre is obtained by decoding and inverse binarization from the bitstream based on truncated unary code (two forms of truncated unary code as shown in Table 4-1 or Table 4-2, a truncated value maxVal=7), and if mv_diff_x_abs_bv_pre is less than or equal to 4, offset is set to be equal to mv_diff_x_abs_bv_pre, and then mv_diff_x_abs_bv is equal to offset.

(2) If mv_diff_x_abs_bv_pre is equal to 5, a value of mv_diff_x_abs_bv belongs to a range [5, 9). offset is set to be equal to 5, 2 bits are entropy decoded from the bitstream, and inversely binarized according to a 2-bit fixed-length code (see Table 5), a suffix value mv_diff_x_abs_by_suf is deduced and obtained, and then mv_diff_x_abs_bv is equal to offset+mv_diff_x_abs_bv suf.

(3) If mv_diff_x_abs_bv_pre is equal to 6, the value of mv_diff_x_abs_bv belongs to a range [9, 17). offset is set to be equal to 9, 3 bits are entropy decoded from the bitstream, and inversely binarized according to a 3-bit fixed-length code (see Table 5), the suffix value mv_diff_x_abs_by_suf is deduced and obtained, and then mv_diff_x_abs_bv is equal to offset+mv_diff_x_abs_bv suf.

(4) If mv_diff_x_abs_bv_pre is equal to 7, the value of mv_diff_x_abs_bv belongs to a range [17, ∞). offset is set to be equal to 17, and 1 bit continues to be decoded from the bitstream to obtain an identifier mv_diff_x_abs_bv_parity indicating parity of mv_diff_x_abs_bv.

(5) After a value of mv_diff_x_abs_bv_parity is obtained, entropy decoding continues to be performed from the bitstream, and inverse binarization is performed based on 2-order exponential Golomb code (see k-order exponential Golomb code table shown in Table 6), to obtain mv_diff_x_abs_bv_k_eg, and then mv_diff_x_abs_bv=offset+mv_diff_x_abs_bv_parity+2×mv_diff_x_abs_bv_k_eg.

Step 302: When the value of mv_diff_x_abs_bv is not 0, then a sign mv_diff_x_sign_bv of a motion vector difference horizontal direction value is deduced after 1 bit is decoded from the bitstream.

Step 303: A motion vector difference vertical direction absolute value mv_diff_y_abs_bv is deduced after decoding from the bitstream. The specific method is similar to (1) to (5) in step 301.

Step 304: When a value of mv_diff_y_abs_bv is not 0, then a sign mv_diff_y_sign_bv of the motion vector difference vertical direction value is deduced after 1 bit is decoded from the bitstream.

TABLE 3

```
mv_diff_x_abs_bv
if (MvDiffXAbsBv)
    mv_diff_x_sign_bv
mv_diff_y_abs_bv
if (MvDiffYAbsBv)
    mv_diff_y_sign_bv
    }
}
```

In Table 3, mv_diff_x_abs_bv represents a block vector horizontal component difference absolute value, and mv_diff_y_abs_bv represents a block vector vertical component difference absolute value. MvDiffXAbsBv is equal to a value of mv_diff_x_abs_bv, and MvDiffYAbsBv is equal to a value of mv_diff_y_abs_bv.

mv_diff_x_sign_bv represents a block vector horizontal component difference sign value, and mv_diff_y_sign_bv represents a block vector vertical component difference sign value. In addition, a value of MvDiffXSignbV is equal to a value of mv_diff_x_sign_bv, and a value of MvDiffYSignBv is equal to mv_diff_y_sign_bv. If mv_diff_x_sign_bv or mv_diff_y_sign_bv does not exist in a bitstream, then a value of MvDiffXSignBv or MvDiffYSignBv is 0.

The values of the block vector horizontal component difference value MvDiffXBv and the block vector vertical component difference value MvDiffYBv are expressed as follows, and a value range is −32768 to 32767:

$$MvDiffXBv=(-1)^{MvDiffXSignBv} \times MvDiffXAbsBv$$

$$MvDiffYBv=(-1)^{MvDiffYSignBv} \times MvDiffYAbsBv$$

TABLE 4-1

| SynElVal | Binary symbol string | | | | | | |
|---|---|---|---|---|---|---|---|
| 0 | 1 | | | | | | |
| 1 | 0 | 1 | | | | | |
| 2 | 0 | 0 | 1 | | | | |
| 3 | 0 | 0 | 0 | 1 | | | |
| 4 | 0 | 0 | 0 | 0 | 1 | | |
| 5 | 0 | 0 | 0 | 0 | 0 | 1 | |
| ... | 0 | 0 | 0 | 0 | 0 | 0 | ... |
| maxVal−1 | 0 | 0 | 0 | 0 | 0 | 0 | ... 1 |
| maxVal | 0 | 0 | 0 | 0 | 0 | 0 | ... 0 |
| binIdx | 0 | 1 | 2 | 3 | 4 | 5 | ... maxVal−1 |

TABLE 4-2

| SynElVal | Binary symbol string | | | | | | |
|---|---|---|---|---|---|---|---|
| 0 | 0 | | | | | | |
| 1 | 1 | 0 | | | | | |
| 2 | 1 | 1 | 0 | | | | |
| 3 | 1 | 1 | 1 | 0 | | | |
| 4 | 1 | 1 | 1 | 1 | 0 | | |
| 5 | 1 | 1 | 1 | 1 | 1 | 0 | |
| ... | 1 | 1 | 1 | 1 | 1 | 1 | ... |
| maxVal−1 | 1 | 1 | 1 | 1 | 1 | 1 | ... 0 |
| maxVal | 1 | 1 | 1 | 1 | 1 | 1 | ... 1 |
| binIdx | 0 | 1 | 2 | 3 | 4 | 5 | ... maxVal−1 |

TABLE 5

| Value of synElVal | Binary symbol string | | | | |
|---|---|---|---|---|---|
| 0 | 0 | 0 | ... | 0 | 0 |
| 1 | 0 | 0 | ... | 0 | 1 |
| 2 | 0 | 0 | ... | 1 | 0 |
| 3 | 0 | 0 | ... | 1 | 1 |
| ... | | | ... | | |
| $2^{len}-4$ | 1 | 1 | ... | 0 | 0 |
| $2^{len}-3$ | 1 | 1 | ... | 1 | 0 |
| $2^{len}-2$ | 1 | 1 | ... | 1 | 0 |
| $2^{len}-1$ | 1 | 1 | ... | 1 | 1 |
| binIdx | 0 | 1 | ... | len-2 | len-1 |

TABLE 6

| Order | Code word structure | CodeNum value range |
|---|---|---|
| k = 0 | 1 | 0 |
| | 0 1 $x_0$ | 1~2 |
| | 0 0 1 $x_1$ $x_0$ | 3~6 |
| | 0 0 0 1 $x_2$ $x_1$ $x_0$ | 7~14 |
| | ... | ... |
| k = 1 | 1 $x_0$ | 0~1 |
| | 0 1 $x_1$ $x_0$ | 2~5 |
| | 0 0 1 $x_2$ $x_1$ $x_0$ | 6~13 |
| | 0 0 0 1 $x_3$ $x_2$ $x_1$ $x_0$ | 14~29 |
| | ... | ... |
| k = 2 | 1 $x_1$ $x_0$ | 0~3 |
| | 0 1 $x_2$ $x_1$ $x_0$ | 4~11 |
| | 0 0 1 $x_3$ $x_2$ $x_1$ $x_0$ | 12~27 |
| | 0 0 0 1 $x_4$ $x_3$ $x_2$ $x_1$ $x_0$ | 28~59 |
| | ... | ... |
| k = 3 | 1 $x_2$ $x_1$ $x_0$ | 0~7 |
| | 0 1 $x_3$ $x_2$ $x_1$ $x_0$ | 8~23 |
| | 0 0 1 $x_4$ $x_3$ $x_2$ $x_1$ $x_0$ | 24~55 |
| | 0 0 0 1 $x_5$ $x_4$ $x_3$ $x_2$ $x_1$ $x_0$ | 56~119 |
| | ... | ... |

The following describes a decoding process of a motion vector difference (MVD). Referring to Table 7, a main process of MVD decoding is as follows (bold and underlined fields in Table 7 represent syntax elements that need to be decoded, capitalized fields without underlines represent variables, and values of the variables may be obtained by decoding the syntax elements):

Step 401: A motion vector difference horizontal direction absolute value mv_diff_x_abs is deduced after decoding from a bitstream, which specifically includes:

(1) A prefix value mv_diff_x_abs_pre is obtained by decoding and inverse binarization from the bitstream based on truncated unary code (two forms of truncated unary code as shown in Table 4-1 or Table 4-2, a truncated value maxVal=3), and if mv_diff_x_abs_pre is less than or equal to 2, offset is set to be equal to mv_diff_x_abs_pre, and then mv_diff_x_abs is equal to offset.

(2) If mv_diff_x_abs_pre is equal to 3, a value of mv_diff_x_abs belongs to a range [3, ∞). offset is set to be equal to 3, and 1 bit continues to be decoded from the bitstream to obtain an identifier mv_diff_x_abs_parity indicating parity of mv_diff_x_abs.

(3) After a value of mv_diff_x_abs_parity is obtained, entropy decoding continues to be performed from the bitstream, and inverse binarization is performed based on 0-order exponential Golomb code (see Table 6) to obtain mv_diff_x_abs_k_eg, and then mv_diff_x_abs=offset+mv_diff_x_abs_parity+2×mv_diff_x_abs_k_eg.

Step 402: When the value of mv_diff_x_abs is not 0, a sign mv_diff_x_sign of a motion vector difference horizontal direction value is deduced after 1 bit is decoded from the bitstream.

Step 403: A motion vector difference vertical direction absolute value mv_diff_y_ab is deduced after decoding from the bitstream. The specific method is similar to (1) to (5) in step 401.

Step 404: When a value of mv_diff_y_abs is not 0, then a sign mv_diff_y_sign of a motion vector difference vertical direction value is deduced after 1 bit is decoded from the bitstream.

TABLE 7 mv_diff_x_abs_l0
if (MvDiffXAbsL0)
    mv_diff_x_sign_l0
mv_diff_y_abs_l0
if (MvDiffYAbsL0)
    mv_diff_y_sign_l0

In Table 7, mv_diff_x_abs_10 represents an L0 motion vector horizontal component difference absolute value, and mv_diff_y_abs_10 represents an L0 motion vector vertical component difference absolute value. A motion vector horizontal component difference absolute value MvDiffXAbsL0 from a reference image line 0 is equal to a value of mv_diff_x_abs_10, and a motion vector vertical component difference absolute value MvDiffYAbsL0 from the reference image line 0 is equal to a value of mv_diff_y_abs_10.

mv_diff_x_sign_10 represents an L0 motion vector horizontal component difference sign value, and mv_diff_y_sign_10 represents an L0 motion vector vertical component difference sign value. A value of a motion vector horizontal component difference sign bit MvDiffXSignL0 from the reference image line 0 is equal to a value of mv_diff_x_sign_10, and a value of a motion vector vertical component difference sign bit MvDiffYSignL0 from the reference image line 0 is equal to a value of mv_diff_y_sign_10. If mv_diff_x_sign_10 or mv_diff_y_sign_10 does not exist in the bitstream, the value of MvDiffXSignL0 or MvDiffYSignL0 is 0.

Values of a motion vector horizontal component difference value MvDiffXL0 and a motion vector vertical component difference value MvDiffYL0 are expressed as follows, and a value range is −32768 to 32767:

MvDiffXL0=(−1)MvDiffXSignL0×MvDiffXAbsL0

MvDiffYL0=(−1)MvDiffYSignL0×MvDiffYAbsL0

It can be seen from the above that in some video coding standards (such as VVC, and AVS3), the motion vector coding method used by the string vector (SV) of the intra string copy (ISC) mode is relatively cumbersome, and the encoding and decoding complexity is relatively high, which is completely different from the motion vector coding methods of the motion vector (MV) of the inter mode and the block vector (BV) of the intra block copy (IBC) mode. According to statistical characteristics of the SV, in the embodiments of this application, a motion vector coding method that conforms to distribution characteristics of the SV is provided, which simplifies the SV encoding and decoding process, and reduces the complexity of SV encoding and decoding, while ensuring the video compression performance, and generally being conducive to improving the efficiency of SV encoding and decoding.

Implementation details of the technical solutions of the embodiments of this application are described below in detail.

Figure 8A:
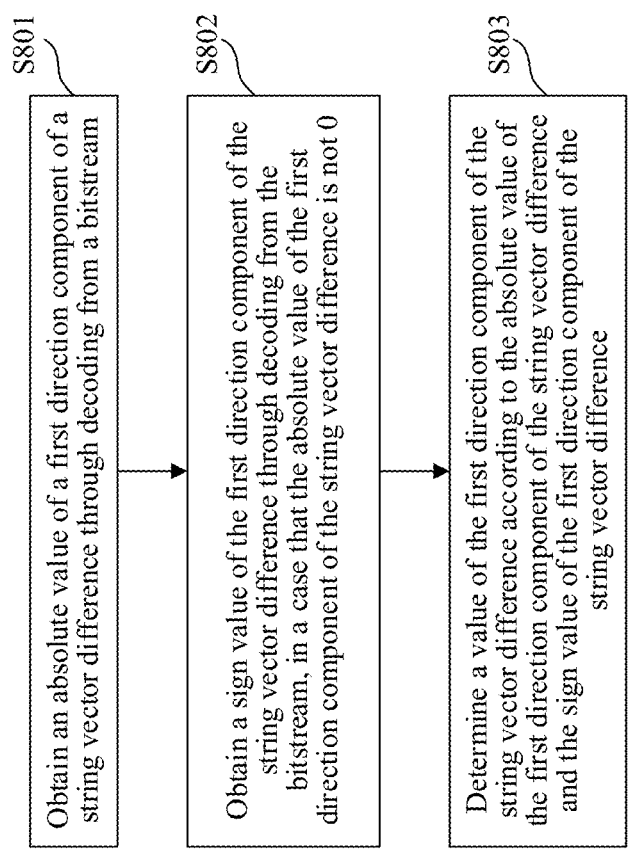
FIG. 8A and FIG. 8B are flowcharts of a video decoding method according to some embodiments of this application.

FIG. 8A is a flowchart of a video decoding method according to some embodiments of this application. The video decoding method may be performed by a device having a computing processing function, for example, may be performed by a terminal device or a server. Referring to FIG. 8A, the video decoding method may include step S801 to step S803.

S801: Obtain an absolute value of a first direction component of a string vector difference through decoding from a bitstream.

S802: Obtain a sign value of the first direction component of the string vector difference through decoding from the bitstream, when the absolute value of the first direction component of the string vector difference is not 0.

S803: Determine a value of the first direction component of the string vector difference according to the absolute value of the first direction component of the string vector difference and the sign value of the first direction component of the string vector difference.

In the technical solutions provided in some embodiments of this application, an absolute value of a first direction component of a string vector difference is obtained by decoding from a bitstream, when the absolute value of the first direction component of the string vector difference is not 0, a sign value of the first direction component of the string vector difference is obtained through decoding from the bitstream, and then, according to the absolute value of the first direction component of the string vector difference, and the sign value of the first direction component of the string vector difference, a value of the first direction component of the string vector difference is determined. In this way, the encoding and decoding process of the string vector difference can be simplified, the encoding and decoding complexity is reduced, and the video encoding and decoding efficiency can be improved.

Figure 8B:
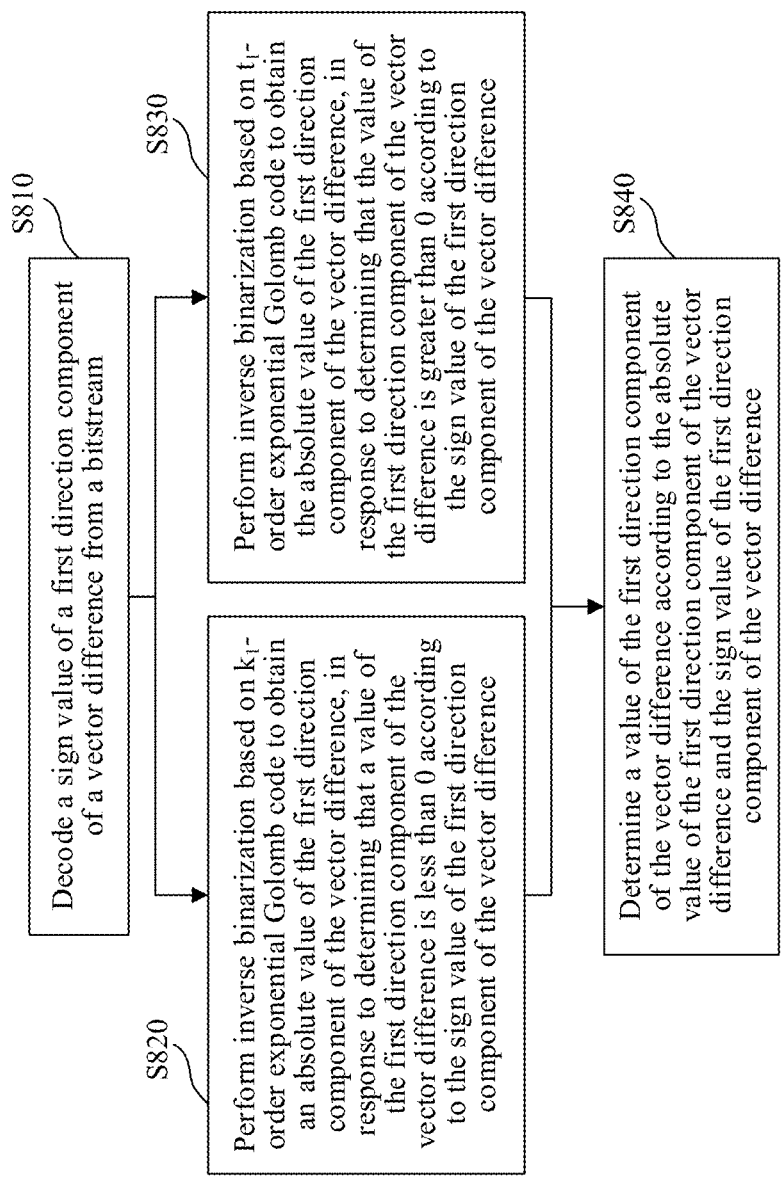

FIG. 8B is a flowchart of a video decoding method according to some embodiments of this application. The video decoding method may be performed by a device having a computing processing function, for example, may be performed by a terminal device or a server. Referring to FIG. 8B, the video decoding method includes at least step S810 to step S840. The detailed description is as follows.

Step S810: Decode a sign value of a first direction component of a vector difference from a bitstream.

In some embodiments of this application, the vector difference may be a string vector difference (SVD), a motion vector difference (MVD), or a block vector difference (BVD). The first direction component may be a vertical direction component, or may be a horizontal direction component.

The sign value of the first direction component of the vector difference is used for indicating whether a value of the first direction component of the vector difference is greater than 0 or less than 0. Specifically, if the sign value of the first direction component of the vector difference is a first value (for example, 1), it is determined that the value of the first direction component of the vector difference is less than 0, and if the sign value of the first direction component of the vector difference is a second value (for example, 0), it is determined that the value of the first direction component of the vector difference is greater than 0.

In some embodiments of this application, a flag bit of the first direction component of the vector difference may be decoded from the bitstream first, and the flag bit of the first direction component of the vector difference is used for indicating whether the value of the first direction component of the vector difference is 0. If the flag bit of the first direction component of the vector difference is the first value (for example, 1), the sign value of the first direction component of the vector difference is decoded from the bitstream. That the flag bit of the first direction component of the vector difference is the first value indicates that the value of the first direction component of the vector difference is not 0. If the flag bit of the first direction component of the vector difference is the second value (for example, 0), it can be directly determined that the value of the first direction component of the vector difference is 0.

Step S820: Perform inverse binarization based on $k_1$-order exponential Golomb code to obtain an absolute value of the first direction component of the vector difference, in response to determining that a value of the first direction component of the vector difference is less than 0 according to the sign value of the first direction component of the vector difference, where $k_1 \geq 0$.

Step S830: Perform inverse binarization based on $t_1$-order exponential Golomb code to obtain the absolute value of the first direction component of the vector difference, in response to determining that the value of the first direction component of the vector difference is greater than 0 according to the sign value of the first direction component of the vector difference, where $t_1 \geq 0$, and $t_1$ and $k_1$ are not equal.

Step S840: Determine the value of the first direction component of the vector difference according to the absolute value of the first direction component of the vector difference and the sign value of the first direction component of the vector difference.

In some embodiments of this application, after the sign value of the first direction component of the vector difference is obtained, the value of the first direction component of the vector difference can be obtained based on the sign value and according to the absolute value of the first direction component of the vector difference. For example, if the absolute value of the first direction component of the vector difference is isc_sv_y_abs_minus1 (that is, the absolute value of the vertical direction component of the string vector difference), then if it is determined that a value IscSvY of the vertical direction component of the string vector difference is less than 0 according to the sign value of the vertical direction component of the string vector difference, IscSvY=−(isc_sv_y_abs_minus1+1); and if it is determined that IscSvY is greater than 0 according to the sign value of the vertical direction component of the string vector difference, IscSvY=isc_sv_y_abs_minus1+1.

In the technical solutions of the embodiment shown in FIG. 8B, an absolute value of a first direction component of a vector difference can be determined according to a value of the first direction component of the vector difference based on Golomb codes of different order exponents, and the value of the first direction component of the vector difference can be further determined based on the absolute value and a sign value of the first direction component of the vector difference. In this way, the encoding and decoding process of the vector difference is simplified, the encoding and decoding complexity is reduced, and the video encoding and decoding efficiency is improved.

In the technical solutions of the embodiment shown in FIG. 8B, the vector difference may be a string vector difference (SVD). In this case, if a string vector predictor (SVP) is not obtained, the string vector difference (SVD) can be used as a string vector (SV). That is, when there is no SVP, the technical solutions of the embodiment shown in FIG. 8B can be used for SV decoding, that is, SV=SVD.

When the string vector predictor (SVP) is obtained, the string vector (SV) can be determined according to the string vector difference (SVD) and the string vector predictor (SVP). That is, when there is an SVP, the technical solutions of the embodiment shown in FIG. 8B can be used for SV and SVD decoding, that is, SV=SVD+SVP.

In addition, the technical solutions of the embodiment shown in FIG. 8B can be used not only for SV/SVD decoding, but also for other amplitude decoding, for example, the decoding of the motion vector difference (MVD) of the inter prediction block, the decoding of the block motion vector difference (BVD) of the intra block copy (IBC), and the like.

Figure 9:
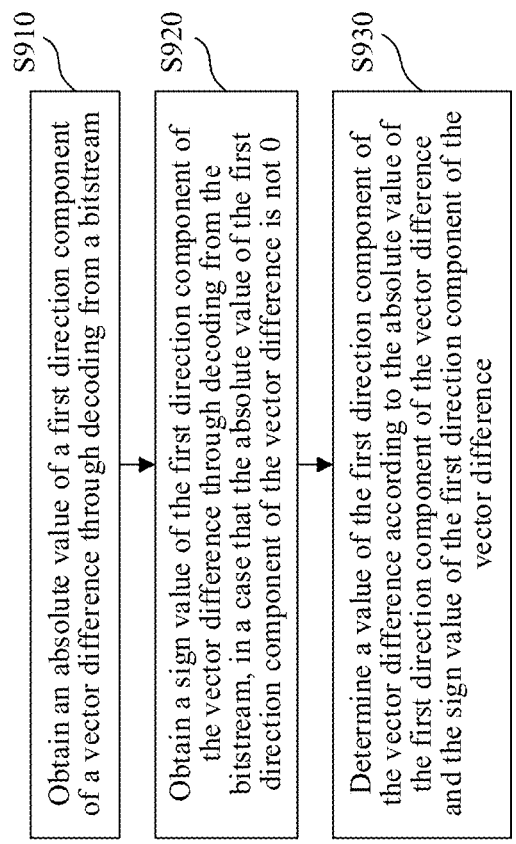
FIG. 9 is a flowchart of a video decoding method according to some embodiments of this application.

FIG. 9 is a flowchart of a video decoding method according to some embodiments of this application. The video decoding method may be performed by a device having a computing processing function, for example, may be performed by a terminal device or a server. Referring to FIG. 9, the video decoding method includes at least step S910 to step S930. The detailed description is as follows.

Step S910: Obtain an absolute value of a first direction component of a vector difference through decoding from a bitstream.

In some embodiments of this application, the vector difference may be a string vector difference (SVD), a motion vector difference (MVD), or a block vector difference (BVD). The first direction component may be a horizontal direction component, or may be a vertical direction component.

In some embodiments of this application, the process of obtaining an absolute value of a first direction component of a vector difference through decoding from a bitstream may be as follows: obtaining a prefix value of the first direction component of the vector difference through decoding from the bitstream and performing inverse binarization based on truncated unary code, and then generating an absolute value of the first direction component of the vector difference according to the prefix value of the first direction component of the vector difference.

In some embodiments, the generating an absolute value of the first direction component of the vector difference according to the prefix value of the first direction component of the vector difference may have the following embodiments:

using the prefix value of the first direction component of the vector difference as the absolute value of the first direction component of the vector difference, when the prefix value of the first direction component of the vector difference is less than or equal to 4;

setting a compensation value to 5 when the prefix value of the first direction component of the vector difference is equal to 5, performing, based on 2-bit fixed-length code, inverse binarization on 2 bits obtained by further decoding from the bitstream, to obtain a suffix value of the first direction component of the vector difference, and generating the absolute value of the first direction component of the vector difference according to the suffix value of the first direction component of the vector difference and the compensation value;

setting the compensation value to 9 when the prefix value of the first direction component of the vector difference is equal to 6, performing, based on 3-bit fixed-length code, inverse binarization on 3 bits obtained by further decoding from the bitstream, to obtain the suffix value of the first direction component of the vector difference, and generating the absolute value of the first direction component of the vector difference according to the suffix value of the first direction component of the vector difference and the compensation value;

setting the compensation value to 17 when the prefix value of the first direction component of the vector difference is equal to 7, and determining parity of the absolute value of the first direction component of the vector difference based on 1 bit obtained by further decoding from the bitstream; and further decoding from the bitstream, performing inverse binarization based on 2-order exponential Golomb code, and generating the absolute value of the first direction component of the vector difference according to a result of performing inverse binarization based on 2-order exponential Golomb code, the compensation value, and the parity of the absolute value of the first direction component of the vector difference.

In some embodiments, the generating an absolute value of the first direction component of the vector difference according to the prefix value of the first direction component of the vector difference may further have the following embodiments:

using the prefix value of the first direction component of the vector difference as the absolute value of the first direction component of the vector difference, when the prefix value of the first direction component of the vector difference is less than or equal to 2;

setting the compensation value to 3 when the prefix value of the first direction component of the vector difference is equal to 3, and determining parity of the absolute value of the first direction component of the vector difference based on 1 bit obtained by further decoding from the bitstream; and further decoding from the bitstream, performing inverse binarization based on 0-order exponential Golomb code, and generating the absolute value of the first direction component of the vector difference according to a result of performing inverse binarization based on 0-order exponential Golomb code, the compensation value, and the parity of the absolute value of the first direction component of the vector difference.

Further referring to FIG. 9, step S920: obtain a sign value of the first direction component of the vector difference through decoding from the bitstream, when the absolute value of the first direction component of the vector difference is not 0.

In some embodiments, when it is determined that the absolute value of the first direction component of the vector difference is not 0, 1 bit continues to be decoded from the bitstream to determine the sign value of the first direction component of the vector difference.

Step S930: Determine a value of the first direction component of the vector difference according to the absolute value of the first direction component of the vector difference and the sign value of the first direction component of the vector difference.

In the technical solutions of the embodiment shown in FIG. 9, the vector difference may be a string vector difference (SVD). In this case, if a string vector predictor (SVP) is not obtained, the string vector difference (SVD) can be used as a string vector (SV). That is, when there is no SVP, the technical solutions of the embodiment shown in FIG. 9 can be used for SV decoding, that is, SV=SVD.

When the string vector predictor (SVP) is obtained, the string vector (SV) can be determined according to the string vector difference (SVD) and the string vector predictor (SVP). That is, when there is an SVP, the technical solutions of the embodiment shown in FIG. 9 can be used for SV and SVD decoding, that is, SV=SVD+SVP.

In addition, the technical solutions of the embodiment shown in FIG. 9 can be used for SV/SVD decoding. In this case, the SV/SVD can be decoded in a manner similar to a BVD or MVD, which simplifies the SV encoding and decoding process, reduces the encoding and decoding complexity, and is conducive to improving the video encoding and decoding efficiency.

Figure 10:
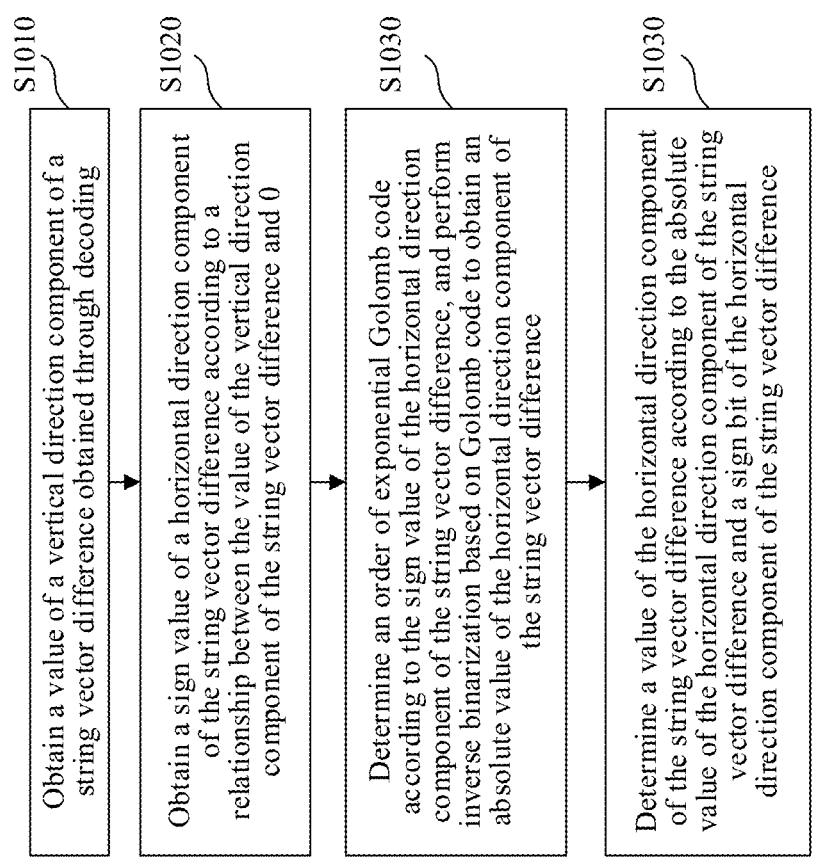
FIG. 10 is a flowchart of a video decoding method according to some embodiments of this application.

FIG. 10 is a flowchart of a video decoding method according to some embodiments of this application. The video decoding method may be performed by a device having a computing processing function, for example, may be performed by a terminal device or a server. Referring to FIG. 10, the video decoding method includes at least step S1010 to step S1040. The detailed description is as follows.

Step S1010: Obtain a value of a vertical direction component of a string vector difference obtained through decoding.

In some embodiments of this application, the value of the vertical direction component of the string vector difference may be obtained through decoding in the method of the foregoing embodiment shown in FIG. 8B, or may be obtained through decoding in the method of the foregoing embodiment shown in FIG. 9, or may be obtained through decoding in a method in a related standard.

Step S1020: Obtain a sign value of a horizontal direction component of the string vector difference according to a relationship between the value of the vertical direction component of the string vector difference and 0.

In some embodiments of this application, if the value of the vertical direction component of the string vector difference is 0, the sign value of the horizontal direction component of the string vector difference can be directly decoded from the bitstream.

In some embodiments of this application, when a start row of decoding is a 0th row, if the value of the vertical direction component of the string vector difference is 0, and a row in which a start point of a current string is located is an odd row, the sign value of the horizontal direction component of the string vector difference can be decoded from the bitstream. In addition, in this case, if the row in which the start point of the current string is located is an even row, a sign bit of the horizontal direction component of the string vector difference can be set to a first value, to indicate that a value of the horizontal direction component of the string vector difference is less than 0.

In some embodiments of this application, if the value of the vertical direction component of the string vector difference is greater than 0, the sign bit of the horizontal direction component of the string vector difference can be set to the first value, to indicate that the value of the horizontal direction component of the string vector difference is less than 0.

In some embodiments of this application, if the value of the vertical direction component of the string vector difference is less than 0, a value of a flag bit of the horizontal direction component of the string vector difference can be decoded from the bitstream. If the flag bit of the horizontal direction component of the string vector difference is the first value (for example, 1), the sign value of the horizontal direction component of the string vector difference is decoded from the bitstream, that is, the flag bit of the horizontal direction component of the string vector difference is the first value, indicating that the value of the horizontal direction component of the string vector difference is not 0. If the flag bit of the horizontal direction component of the string vector difference is a second value (for example, 0), it can be determined that the value of the horizontal direction component of the string vector difference is 0.

Further referring to FIG. 10, step S1030: determine an order of exponential Golomb code according to the sign value of the horizontal direction component of the string vector difference, and perform inverse binarization based on Golomb code to obtain an absolute value of the horizontal direction component of the string vector difference.

In some embodiments of this application, if the sign value of the horizontal direction component of the string vector difference indicates that the value of the horizontal direction component of the string vector difference is less than 0, the inverse binarization can be performed based on $k_2$-order exponential Golomb code to obtain the absolute value of the horizontal direction component of the string vector difference, and $k_2 \geq 0$; and if the sign value of the horizontal direction component of the string vector difference indicates that the value of the horizontal direction component of the string vector difference is greater than 0, inverse binarization is performed based on $t_2$-order exponential Golomb code to obtain the absolute value of the horizontal direction component of the string vector difference, $t_2 \geq 0$, and $t_2$ and $k_2$ are not equal.

That is, in the technical solutions of the embodiments of this application, an absolute value of a horizontal direction component of a string vector difference can be determined according to a value of the horizontal direction component of the string vector difference by using Golomb codes of different orders, which simplifies the encoding and decoding process of the string vector difference, reduces the encoding and decoding complexity, and is conducive to improving the video encoding and decoding efficiency.

Step S1040: Determine a value of the horizontal direction component of the string vector difference according to an absolute value of the horizontal direction component of the string vector difference and a sign bit of the horizontal direction component of the string vector difference.

In the technical solutions of the embodiment shown in FIG. 10, the value of the horizontal direction component of the string vector difference depends on the value of the vertical direction component of the string vector difference. In this case, the value of the vertical direction component of the string vector difference needs to be decoded first, and then the value of the horizontal direction component of the string vector difference is determined based on the value of the vertical direction component of the string vector difference. Specifically, there are a case where the value of the vertical direction component of the string vector difference is 0, a case where the value of the vertical direction component of the string vector difference is greater than 0, and a case where the value of the vertical direction component of the string vector difference is less than 0.

When the value of the vertical direction component of the string vector difference is 0, the sign value of the horizontal direction component of the string vector difference can be decoded from the bitstream first; when the sign value of the horizontal direction component of the string vector difference indicates that the value of the horizontal direction component of the string vector difference is less than 0, inverse binarization can be performed based on $k_2$-order exponential Golomb code to obtain the absolute value of the horizontal direction component of the string vector difference; and when the sign value of the horizontal direction component of the string vector difference indicates that the value of the horizontal direction component of the string vector difference is greater than 0, inverse binarization is performed based on $t_2$-order exponential Golomb code to obtain the absolute value of the horizontal direction component of the string vector difference, and then, according to the absolute value of the horizontal direction component of the string vector difference, and the sign value of the horizontal direction component of the string vector difference, the value of the horizontal direction component of the string vector difference is determined.

When the value of the vertical direction component of the string vector difference is 0, it can also be determined that the row in which the start point of the current string is located is an odd row (when the start row of decoding is the 0th row), and when the row is an odd row, the sign value of the horizontal direction component of the string vector difference is decoded from the bitstream. When the row is an even row, the sign value of the horizontal direction component of the string vector difference can be directly set to the first value, to indicate that the value of the horizontal direction component of the string vector difference is less than 0, inverse binarization is performed based on $k_2$-order exponential Golomb code to obtain the absolute value of the horizontal direction component of the string vector difference, and then, according to the absolute value of the horizontal direction component of the string vector difference, and the sign value of the horizontal direction component of the string vector difference, the value of the horizontal direction component of the string vector difference is determined.

When the value of the vertical direction component of the string vector difference is greater than 0, the sign value of the horizontal direction component of the string vector difference may be set to the first value, to indicate that the value of the horizontal direction component of the string vector difference is less than 0, then inverse binarization is performed based on $k_2$-order exponential Golomb code to obtain the absolute value of the horizontal direction component of the string vector difference, and according to the absolute value of the horizontal direction component of the string vector difference, and the sign value of the horizontal direction component of the string vector difference, the value of the horizontal direction component of the string vector difference is determined.

When the value of the vertical direction component of the string vector difference is less than 0, the flag bit of the horizontal direction component of the string vector difference can be decoded from the bitstream. If the flag bit of the horizontal direction component of the string vector difference is the first value (indicating that the value of the horizontal direction component of the string vector difference is not 0), then the sign value of the horizontal direction component of the string vector difference is decoded from the bitstream; and then, according to the value of the horizontal direction component of the string vector difference, Golomb codes of different orders are used for determining the absolute value of the horizontal direction component of the string vector difference, and according to the absolute value of the horizontal direction component of the string vector difference, and the sign value of the horizontal direction component of the string vector difference, the value of the horizontal direction component of the string vector difference is determined. In addition, if the flag bit of the horizontal direction component of the string vector difference is the second value, it can be determined that the value of the horizontal direction component of the string vector difference is 0.

In the technical solutions of the embodiment shown in FIG. 10, if a string vector predictor (SVP) is not obtained, a string vector difference (SVD) can be used as a string vector (SV). That is, when there is no SVP, the technical solutions of the embodiment shown in FIG. 10 can be used for SV decoding, that is, SV=SVD. When the string vector predictor (SVP) is obtained, the string vector (SV) can be determined according to the string vector difference (SVD) and the string vector predictor (SVP). That is, when there is an SVP, the technical solutions of the embodiment shown in FIG. 10 can be used for SV and SVD decoding, that is, SV=SVD+SVP.

In combination with FIG. 8A to FIG. 10, the technical solutions of the embodiments of this application can be more in line with distribution characteristics of the SV, which simplifies the SV encoding and decoding process, and reduces the complexity of SV encoding and decoding, while ensuring the video compression performance, and generally being conducive to improving the efficiency of SV encoding and decoding. An example in which a string scanning direction is a horizontal direction is used. From the perspective of the decoder side, the implementation details of the technical solutions of the embodiments of this application applied to an SV decoding scenario are described in detail, which may mainly include the following steps:

Step 501: A flag isc_sv_above_flag above a string vector is decoded, and when a value of isc_sv_above_flag is 1, a value of IscSvX is 0, and a value of IscSvY is −1.

Step 502: When the value of isc_sv_above_flag is 0, a string vector historical flag isc_sv_recent_flag is decoded. When a value of isc_sv_recent_flag is 1, a string vector historical index isc_sv_recent_index continues to be decoded, and according to the value of isc_sv_recent_index, in combination with an intra history based motion vector prediction list, the values of IscSvX and IscSvY are obtained by looking up the list.

The processing process of step 502 is similar to a skip/direct mode of the SV, and it can be understood that there is a prediction process of the SV, that is, SVP is not 0.

Step 503: When a value of isc_sv_recent_flag is 0, SVs (IscSvX, and IscSvY) are obtained through decoding according to the following methods.

When there is no SVP, the technical solutions of the embodiments of this application can be used for SV decoding, that is, SV=SVD. When there is an SVP, the technical solutions of the embodiments of this application can be used for SV and SVD decoding, where SV=SVD+SVP. That is, when step 501 and/or step 502 does not exist, the technical solutions of the embodiments of this application can be directly used for decoding the SV.

The value of IscSvY is deduced from the bitstream through decoding, and one of the following methods may be used:

Method 1y: a decoding method similar to MVD. For details, reference may be made to the related content of step 401 to step 403 in the foregoing embodiments.

Method 2y: a decoding method similar to BVD. For details, reference may be made to the related content of step 301 to step 304 in the foregoing embodiments.

Method 3y: a decoding method for SV in a related standard. For details, reference may be made to the related content of step 2031 to step 2033 in the foregoing embodiments.

Method 4y: The method includes the following steps:

(4y.1): A string vector Y component flag isc_sv_y_non_zero_flag is decoded.

(4y.2): If a value of isc_sv_y_non_zero_flag is 0, the value of IscSvY is 0.

(4y.3): If the value of isc_sv_y_non_zero_flag is 1, the value of IscSvY is not 0. A string vector Y component sign bit isc_sv_y_sign is further decoded to obtain a value of isc_sv_y_sign, and if the value of isc_sv_y_sign is 1, that is, the value of IscSvY is less than 0; and if the value of isc_sv_y_sign is 0, that is, the value of IscSvY is greater than 0.

(4y.4): A string vector Y component absolute value isc_sv_y_abs_minus1 is obtained through decoding and inverse binarization according to the following methods:

If the value of isc_sv_y_sign is 1, that is, the value of IscSvY is less than 0, then the string vector Y component absolute value isc_sv_y_abs_minus1 is obtained through decoding and inverse binarization based on a k-order exponential Golomb code table (see the k-order exponential Golomb code table shown in Table 6); and if the value of isc_sv_y_sign is 0, that is, the value of IscSvY is greater than 0, then the string vector Y component absolute value isc_sv_y_abs_minus1 is obtained through decoding and inverse binarization based on a t-order exponential Golomb method.

k>=0, t>=0, k and t are integers, and k is not equal to t.

(4y.5): A value of IscSvYAbs is set to be equal to isc_sv_y_abs_minus1+1, and then in combination with the value of isc_sv_y_sign, the value of IscSvY is obtained.

The value of IscSvX is deduced from the bitstream through decoding, and one of the following methods may be used:

Method 1x: a decoding method similar to MVD. For details, reference may be made to the related content of step 401 to step 403 in the foregoing embodiments.

Method 2x: a decoding method similar to BVD. For details, reference may be made to the related content of step 301 to step 304 in the foregoing embodiments.

Method 3x: a decoding method for SV in a related standard. For details, reference may be made to the related content of step 2031 to step 2033 in the foregoing embodiments.

Method 4x: The method includes the following steps:

(4x.1): A string vector X component flag isc_sv_x_non_zero_flag is decoded.

(4x.2) If a value of isc_sv_x_non_zero_flag is 0, the value of IscSvX is 0.

(4x.3) If the value of isc_sv_x_non_zero_flag is 1, the value of IscSvX is not 0. A string vector X component sign bit isc_sv_x_sign is further decoded to obtain a value of isc_sv_x_sign, and if the value of isc_sv_x_sign is 1, that is, the value of IscSvX is less than 0; and if the value of isc_sv_x_sign is 0, that is, the value of IscSvX is greater than 0.

(4x.4): A string vector X component absolute value isc_sv_x_abs_minus1 is obtained through decoding and inverse binarization according to the following methods:

If the value of isc_sv_x_sign is 1, that is, the value of IscSvX is less than 0, then the string vector X component absolute value isc_sv_x_abs_minus1 is obtained through decoding and inverse binarization based on a k-order exponential Golomb code table (see the k-order exponential Golomb code table shown in Table 6); and if the value of isc_sv_x_sign is 0, that is, the value of IscSvX is greater than 0, then the string vector X component absolute value isc_sv_x_abs_minus1 is obtained through decoding and inverse binarization based on a t-order exponential Golomb method.

k>=0, t>=0, k and t are integers, and k is not equal to t.

(4x.5): A value of IscSvXAbs is set to be equal to isc_sv_x_abs_minus1+1, and then in combination with the value of isc_sv_x_sign, the value of IscSvX can be obtained.

Method 5x: The method includes the following steps:

(5x.1): When the value of IscSvY is 0 (where IscSvY can be obtained through decoding according to any one of the foregoing method 1y to method 4y), then IscSvx is obtained through decoding according to the following steps:

A. If a value of IsOddRow is 1, that is, the row in which the start point of the current string is located is an odd row (it is assumed that the start row is the 0th row), then the string vector X component sign bit isc_sv_x_sign is decoded to obtain the value of isc_sv_x_sign; if the value of isc_sv_x_sign is 1, that is, the value of IscSvx is less than 0; and if the value of isc_sv_x_sign is 0, that is, the value of IscSvx is greater than 0.

B. If the value of IsOddRow is 0, that is, the row in which the start point of the current string is located is an even row, the value of isc_sv_x_sign is directly set to 1, that is, the value of IscSvx is less than 0.

In other embodiments of this application, there is no need to perform step A and step B, that is, there is no need to calculate the value of IsOddRow, and the string vector X component sign bit isc_sv_x_sign is directly decoded from the bitstream to obtain the value of isc_sv_x_sign. This method can simplify the SV encoding and decoding process to a certain extent.

C. After the value of isc_sv_x_sign is obtained, the string vector X component absolute value isc_sv_x_abs_minus1 can be obtained through decoding and inverse binarization according to the following methods:

if the value of isc_sv_x_sign is 1, that is, the value of IscSvx is less than 0, then the string vector X component absolute value isc_sv_x_abs_minus1 is obtained through decoding and inverse binarization based on a k-order exponential Golomb method; and if the value of isc_sv_x_sign is 0, that is, the value of IscSvx is greater than 0, then the string vector X component absolute value isc_sv_x_abs_minus1 is obtained through decoding and inverse binarization based on a t-order exponential Golomb method.

k>=0, t>=0, k and t are integers, and k is not equal to t.

D. The value of IscSvXAbs is set to be equal to isc_sv_x_abs_minus1+1, and then in combination with the value of isc_sv_x_sign, the value of IscSvX can be obtained.

(5x.2): If the value of IscSvy is greater than 0, then the value of isc_sv_x_sign can be directly set to 1, that is, the value of IscSvx is less than 0, then the string vector X component absolute value isc_sv_x_abs_minus1 can be obtained through decoding and inverse binarization based on a k-order exponential Golomb method. Then, the value of IscSvXAbs is set to be equal to isc_sv_x_abs_minus1+1, and then in combination with the value of isc_sv_x_sign, the value of IscSvX can be obtained.

(5x.3) If the value of IscSvy is less than 0, the string vector X component flag isc_sv_x_non_zero_flag is decoded. If the value of isc_sv_x_non_zero_flag is 0, that is, the value of IscSvX is 0.

If the value of isc_sv_x_non_zero_flag is 1, then the value of IscSvX is not 0, and the string vector X component sign bit isc_sv_x_sign is further decoded to obtain the value of isc_sv_x_sign. If the value of isc_sv_x_sign is 1, that is, the value of IscSvx is less than 0, then the string vector X component absolute value isc_sv_x_abs_minus1 is obtained through decoding and inverse binarization based on a k-order exponential Golomb method; and if the value of isc_sv_x_sign is 0, that is, the value of IscSvx is greater than 0, then the string vector X component absolute value isc_sv_x_abs_minus1 is obtained through decoding and inverse binarization based on a t-order exponential Golomb method.

k>=0, t>=0, k and t are integers, and k is not equal to t.

Then, the value of IscSvXAbs is set to be equal to isc_sv_x_abs_minus1+1, and then in combination with the value of isc_sv_x_sign, the value of IscSvX can be obtained.

In the technical solutions of the foregoing embodiments, isc_sv_x_sign and isc_sv_y_sign may be decoded in a bypass manner. Alternatively, isc_sv_x_sign and isc_sv_y_sign may also be decoded in a CABAC manner.

When isc_sv_x_sign and isc_sv_y_sign are decoded using CABAC, then selection of a context model and determining of ctxIdxInc may be performed in one of the following manners:

a) a single context model is used, and ctxIdxInc=0;
    b) for a solution of decoding to obtain IscSvY first, for example, the method 5x described above, for ctxIdxInc of isc_sv_x_sign, a context model may be determined according to a sign of IscSvY: ctxIdxInc=IscSvY<0?0:(IscSvY==0?1:2); and
    c) when IscSvX is obtained through decoding first, and then IscSvY is decoded, then for ctxIdxInc of isc_sv_y_sign, the context model may be determined according to a sign of IscSvX: ctxIdxInc=IscSvX<0?0:(IscSvX==0?1:2).

In the foregoing embodiments, IscSvY may be obtained through decoding according to any one of the foregoing method 1y to method 4y; and IscSvX may be obtained through decoding according to any one of the foregoing method 1x to method 5x. When IscSvX is decoded according to any one of the foregoing method 1x to method 4x, there is no dependency between a decoding process of IscSvX and a decoding process of IscSvY, which can be performed in parallel; and when IscSvX adopts the foregoing method 5x, then IscSvY needs to be decoded first, and then IscSvX needs to be decoded.

In some embodiments, IscSvY may be obtained through decoding according to the foregoing method 2y, and IscSvX may be obtained through decoding according to the foregoing method 4x or method 5x.

Figure 8C:
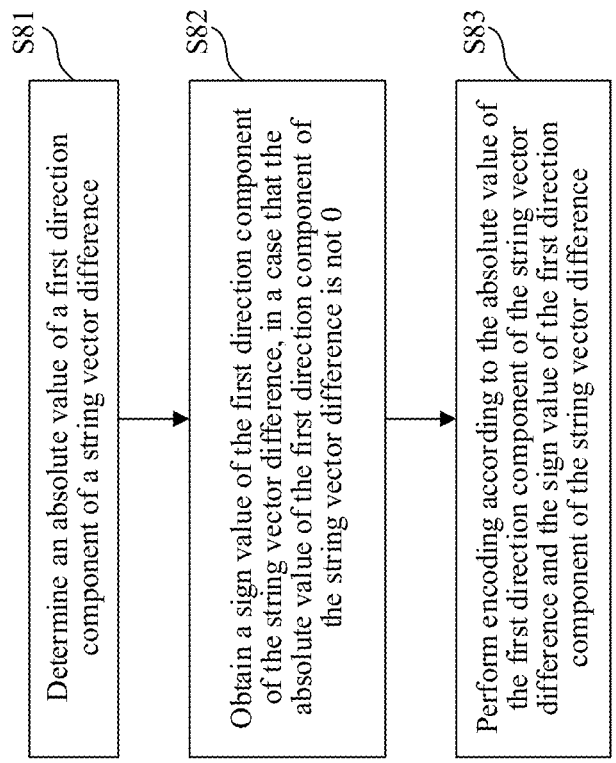
FIG. 8C is a flowchart of a video encoding method according to some embodiments of this application.

The foregoing embodiments are mainly described from the perspective of the decoder side, and FIG. 8C is a flowchart of a video encoding method according to an embodiment of this application. As shown in FIG. 8C, the method includes:

S81: Determine an absolute value of a first direction component of a string vector difference.

S82: Obtain a sign value of the first direction component of the string vector difference, when the absolute value of the first direction component of the string vector difference is not 0.

S83: Perform encoding according to the absolute value of the first direction component of the string vector difference and the sign value of the first direction component of the string vector difference.

A specific processing process of the encoder side is similar to that of the decoder side, and details are not described herein again.

In summary, according to statistical characteristics of the SV, in the technical solutions of the embodiments of this application, a motion vector coding method that conforms to distribution characteristics of the SV is provided, which simplifies the SV encoding and decoding process, and reduces the complexity of SV encoding and decoding, while ensuring the video compression performance, and generally being conducive to improving the efficiency of SV encoding and decoding.

The following describes the apparatus embodiments of this application, which may be configured to perform the method in the foregoing embodiments of this application. For details not disclosed in the apparatus embodiments of this application, refer to the foregoing method embodiments of this application.

Figure 11A:
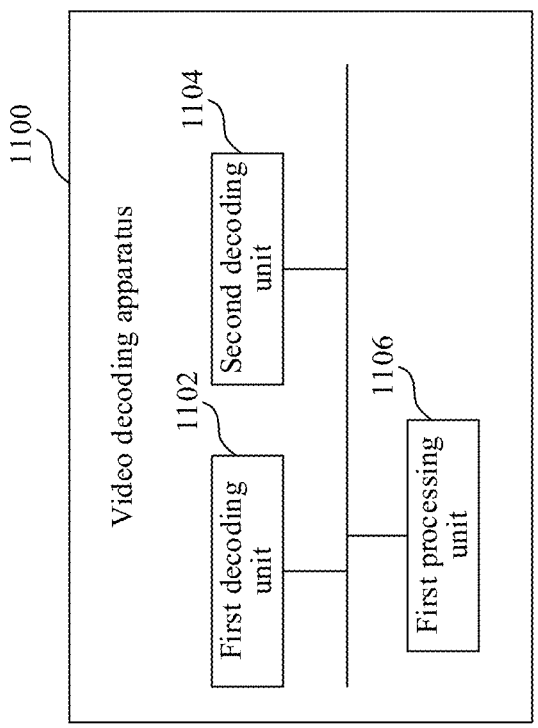
FIG. 11A is a block diagram of a video decoding apparatus according to some embodiments of this application.

FIG. 11A is a block diagram of a video decoding apparatus according to some embodiments of this application. The video decoding apparatus may be arranged in a device with a computing processing function, for example, may be arranged in a terminal device or a server.

Referring to FIG. 11A, a video decoding apparatus 1100 according to some embodiments of this application includes: a first decoding unit 1102, a second decoding unit 1104, and a first processing unit 1106.

The first decoding unit 1102 is configured to obtain an absolute value of a first direction component of a string vector difference through decoding from a bitstream. The second decoding unit 1104 is configured to obtain a sign value of the first direction component of the string vector difference through decoding from the bitstream, when the absolute value of the first direction component of the string vector difference is not 0. The first processing unit 1106 is configured to determine a value of the first direction component of the string vector difference according to the absolute value of the first direction component of the string vector difference and the sign value of the first direction component of the string vector difference.

In some embodiments of this application, based on the foregoing solutions, the first decoding unit 1102 is configured to: obtain a prefix value of the first direction component of the string vector difference through decoding from the bitstream and perform inverse binarization based on truncated unary code; and generate the absolute value of the first direction component of the string vector difference according to the prefix value of the first direction component of the string vector difference.

In some embodiments of this application, based on the foregoing solutions, the first decoding unit 1102 is configured to: use the prefix value of the first direction component of the string vector difference as the absolute value of the first direction component of the string vector difference, when the prefix value of the first direction component of the string vector difference is less than or equal to 4;
  set a compensation value to 5 when the prefix value of the first direction component of the string vector difference is equal to 5, perform, based on 2-bit fixed-length code, inverse binarization on 2 bits obtained by further decoding from the bitstream, to obtain a suffix value of the first direction component of the string vector difference, and generate the absolute value of the first direction component of the string vector difference according to the suffix value of the first direction component of the string vector difference and the compensation value;
  set the compensation value to 9 when the prefix value of the first direction component of the string vector difference is equal to 6, perform, based on 3-bit fixed-length code, inverse binarization on 3 bits obtained by further decoding from the bitstream, to obtain the suffix value of the first direction component of the string vector difference, and generate the absolute value of the first direction component of the string vector difference according to the suffix value of the first direction component of the string vector difference and the compensation value.

set the compensation value to 17 when the prefix value of the first direction component of the string vector difference is equal to 7, and determine parity of the absolute value of the first direction component of the string vector difference based on 1 bit obtained by further decoding from the bitstream; and further decode from the bitstream, perform inverse binarization based on 2-order exponential Golomb code, and generate the absolute value of the first direction component of the string vector difference according to a result of performing inverse binarization based on 2-order exponential Golomb code, the compensation value, and the parity of the absolute value of the first direction component of the string vector difference.

In some embodiments of this application, based on the foregoing solutions, the first decoding unit 1102 is configured to: use the prefix value of the first direction component of the string vector difference as the absolute value of the first direction component of the string vector difference, when the prefix value of the first direction component of the string vector difference is less than or equal to 2;
  set a compensation value to 3 when the prefix value of the first direction component of the string vector difference is equal to 3, and determine parity of the absolute value of the first direction component of the string vector difference based on 1 bit obtained by further decoding from the bitstream; and further decode from the bitstream, perform inverse binarization based on 0-order exponential Golomb code, and generate the absolute value of the first direction component of the string vector difference according to a result of performing inverse binarization based on 0-order exponential Golomb code, the compensation value, and the parity of the absolute value of the first direction component of the string vector difference.

In some embodiments of this application, based on the foregoing solutions, when the first direction component of the string vector difference is the vertical direction component of the string vector difference, the video decoding apparatus 1100 further includes: a second processing unit, configured to obtain a sign value of a horizontal direction component of the string vector difference through decoding from the bitstream, when a value of the vertical direction component of the string vector difference is 0; perform inverse binarization based on $k_1$-order exponential Golomb code to obtain an absolute value of the horizontal direction component of the string vector difference, in response to determining that a value of the horizontal direction component of the string vector difference is less than 0 according to the sign value of the horizontal direction component of the string vector difference, where $k_1 \geq 0$; perform inverse binarization based on $t_1$-order exponential Golomb code to obtain the absolute value of the horizontal direction component of the string vector difference, in response to determining that the value of the horizontal direction component of the string vector difference is greater than 0 according to the sign value of the horizontal direction component of the string vector difference, where $t_1 > 0$, and $t_1$ and $k_1$ are not equal; and determine the value of the horizontal direction component of the string vector difference according to the absolute value of the horizontal direction component of the string vector difference and the sign value of the horizontal direction component of the string vector difference.

In some embodiments of this application, based on the foregoing solutions, the second processing unit is configured to: before decoding the sign value of the horizontal direction component of the string vector difference from the bitstream, and when a start row of decoding is a 0th row and a row in which a start point of a current string is located is an odd row, decode the sign value of the horizontal direction component of the string vector difference from the bitstream; set the sign value of the horizontal direction component of the string vector difference to a first value when the row in which the start point of the current string is located is an even row, to indicate that the value of the horizontal direction component of the string vector difference is less than 0, and perform inverse binarization based on $k_1$-order exponential Golomb code to obtain the absolute value of the horizontal direction component of the string vector difference; and determine the value of the horizontal direction component of the string vector difference according to the absolute value of the horizontal direction component of the string vector difference and the sign value of the horizontal direction component of the string vector difference.

In some embodiments of this application, based on the foregoing solutions, the second processing unit is further configured to: set the sign value of the horizontal direction component of the string vector difference to the first value when the value of the vertical direction component of the string vector difference is greater than 0, to indicate that the value of the horizontal direction component of the string vector difference is less than 0; perform inverse binarization based on $k_1$-order exponential Golomb code to obtain an absolute value of the horizontal direction component of the string vector difference; and determine the value of the horizontal direction component of the string vector difference according to the absolute value of the horizontal direction component of the string vector difference and the sign value of the horizontal direction component of the string vector difference.

In some embodiments of this application, based on the foregoing solutions, the second processing unit is further configured to: decode a flag bit of the horizontal direction component of the string vector difference from the bitstream, when the value of the vertical direction component of the string vector difference is less than 0; decode a sign value of the horizontal direction component of the string vector difference from the bitstream, in a case the flag bit of the horizontal direction component of the string vector difference is a first value; where that the flag bit of the horizontal direction component of the string vector difference is the first value means that a value of the horizontal direction component of the string vector difference is not 0; perform inverse binarization based on $k_1$-order exponential Golomb code to obtain an absolute value of the horizontal direction component of the string vector difference, in response to determining that the value of the horizontal direction component of the string vector difference is less than 0 according to the sign value of the horizontal direction component of the string vector difference, where $k_1 \geq 0$; perform inverse binarization based on $t_1$-order exponential Golomb code to obtain the absolute value of the horizontal direction component of the string vector difference, in response to determining that the value of the horizontal direction component of the string vector difference is greater than 0 according to the sign value of the horizontal direction component of the string vector difference, where $t_1 > 0$, and $t_1$ and $k_1$ are not equal; and determine the value of the horizontal direction component of the string vector difference according to the absolute value of the horizontal direction component of the string vector difference and the sign value of the horizontal direction component of the string vector difference.

In some embodiments of this application, based on the foregoing solutions, the second processing unit is further configured to: determine that the value of the horizontal direction component of the string vector difference is 0, when the flag bit of the horizontal direction component of the string vector difference is a second value.

In some embodiments of this application, based on the foregoing solutions, the video decoding apparatus 1100 further includes: a third processing unit, configured to: decode a sign value of a second direction component of the string vector difference from the bitstream; perform inverse binarization based on $k_2$-order exponential Golomb code to obtain an absolute value of the second direction component of the string vector difference, in response to determining that a value of the second direction component of the string vector difference is less than 0 according to the sign value of the second direction component of the string vector difference, where $k_2 \geq 0$; perform inverse binarization based on $t_2$-order exponential Golomb code to obtain the absolute value of the second direction component of the string vector difference, in response to determining that the value of the second direction component of the string vector difference is greater than 0 according to the sign value of the second direction component of the string vector difference, where $t_2 \geq 0$, and $t_2$ and $k_2$ are not equal; and determine the value of the second direction component of the string vector difference according to the absolute value of the second direction component of the string vector difference and the sign value of the second direction component of the string vector difference.

In some embodiments of this application, based on the foregoing solutions, the third processing unit is configured to: decode a flag bit of the second direction component of the string vector difference from the bitstream; and decode the sign value of the second direction component of the string vector difference from the bitstream, in a case the flag bit of the second direction component of the string vector difference is a first value; where that the flag bit of the second direction component of the string vector difference is the first value means that the value of the second direction component of the string vector difference is not 0.

In some embodiments of this application, based on the foregoing solutions, the third processing unit is further configured to: determine that the value of the second direction component of the string vector difference is 0, when the flag bit of the second direction component of the string vector difference is a second value.

In some embodiments of this application, based on the foregoing solutions, the third processing unit is configured to: determine that the value of the second direction component of the string vector difference is less than 0, when the sign value of the second direction component of the string vector difference is the first value; and determine that the value of the second direction component of the string vector difference is greater than 0, when the sign value of the second direction component of the string vector difference is a second value.

In some embodiments of this application, based on the foregoing solutions, the first processing unit 1106 is further configured to: use a string vector difference (SVD) as a string vector (SV), when a string vector predictor (SVP) is not obtained; and determine the string vector (SV) according to the string vector difference (SVD) and the string vector predictor (SVP), when the string vector predictor (SVP) is obtained.

Figure 11B:
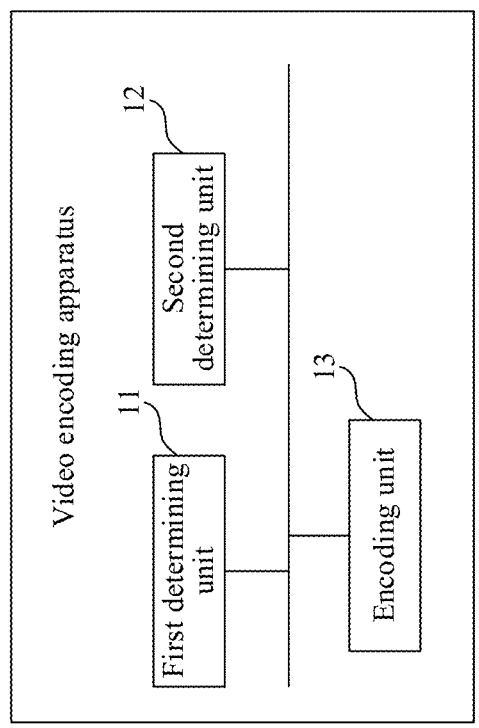
FIG. 11B is a block diagram of a video encoding apparatus according to an embodiment of this application.

FIG. 11B is a schematic structural diagram of a video encoding apparatus according to an embodiment of this application. As shown in FIG. 11B, the video encoding apparatus includes:

a first determining unit 11, configured to determine an absolute value of a first direction component of a string vector difference;
  a second determining unit 12, configured to obtain a sign value of the first direction component of the string vector difference, when the absolute value of the first direction component of the string vector difference is not 0; and
  an encoding unit 13, configured to perform encoding according to the absolute value of the first direction component of the string vector difference and the sign value of the first direction component of the string vector difference.

For the specific functions of the video encoding apparatus, reference may be made to the foregoing embodiments, and details are not described herein again.

Figure 12:
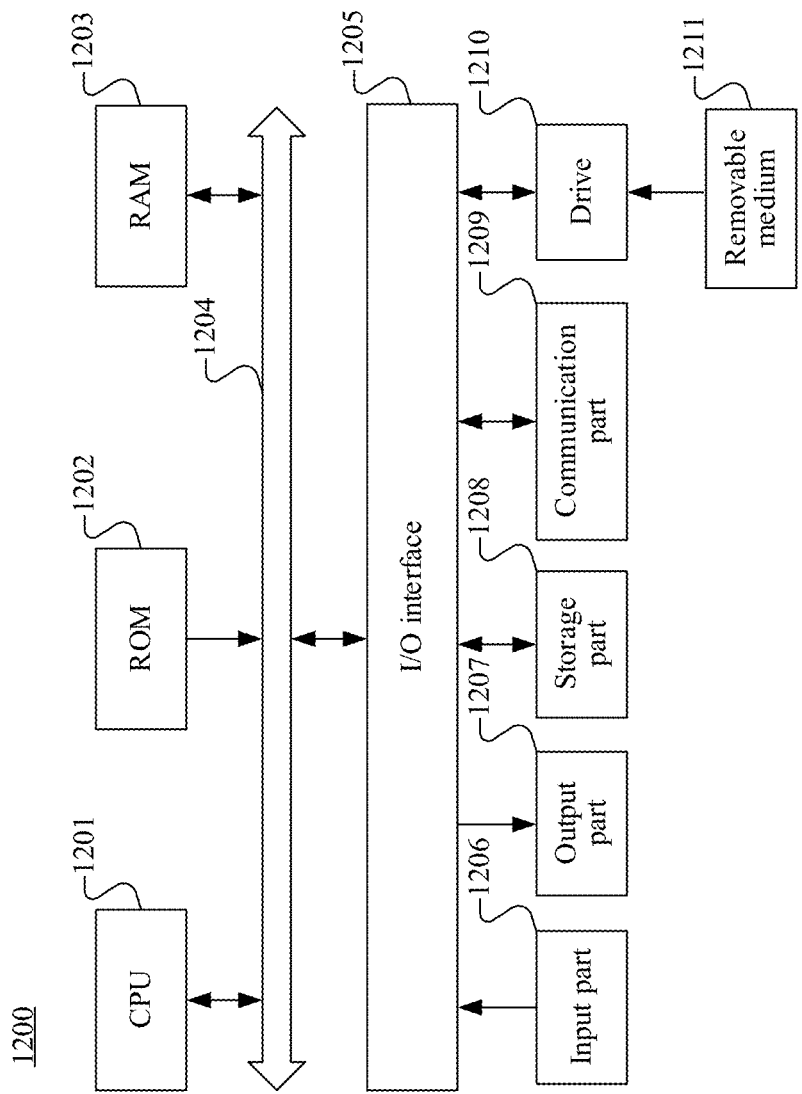
FIG. 12 is a schematic structural diagram of a computer system adapted to implement an electronic device according to an embodiment of this application.

FIG. 12 is a schematic structural diagram of a computer system adapted to implement an electronic device according to an embodiment of this application.

The computer system 1200 of the electronic device shown in FIG. 12 is merely an example, and does not constitute any limitation on functions and use ranges of the embodiments of this application.

As shown in FIG. 12, the computer system 1200 includes a central processing unit (CPU) 1201, which can execute various appropriate actions and processing according to a program stored in a read-only memory (ROM) 1202 or a program loaded from a storage part 1208 to a random access memory (RAM) 1203, such as performing the methods described in the foregoing embodiments. The RAM 1203 further stores various programs and data required for operating the system. The CPU 1201, the ROM 1202, and the RAM 1203 are connected to each other through a bus 1204. An input/output (I/O) interface 1205 is also connected to the bus 1204.

The following components are connected to the I/O interface 1205: an input part 1206 including a keyboard and a mouse, etc.; an output part 1207 including a cathode ray tube (CRT), a liquid crystal display (LCD), a speaker, or the like; a storage part 1208 including hard disk, or the like; and a communication part 1209 including a network interface card such as a local area network (LAN) card, a modem, or the like. The communication part 1209 performs communication processing by using a network such as the Internet. A drive 1210 is also connected to the I/O interface 1205 as required. A removable medium 1211, such as a disk, an optical disc, a magneto-optical disc, or a semiconductor memory, is installed on the drive 1210 as required, so that a computer program read from the removable medium 1211 is installed in the storage part 1208 as required.

Particularly, according to an embodiment of the present application, the processes described above by referring to the flowcharts may be implemented as computer software programs. For example, an embodiment of this application includes a computer program product. The computer program product includes a computer program stored in a non-transitory computer-readable medium. The computer program includes a computer program used for performing a method shown in the flowchart. In such an embodiment, by using the communication part 1209, the computer program may be downloaded and installed from a network, and/or installed from the removable medium 1211. When the computer program is executed by the CPU 1201, the various functions defined in the system of this application are executed.

The computer-readable medium shown in the embodiments of this application may be a computer-readable signal medium or a computer-readable storage medium or any combination of two. The computer-readable storage medium may be, for example, but is not limited to, an electrical, magnetic, optical, electromagnetic, infrared, or semiconductor system, apparatus, or device, or any combination thereof. A more specific example of the computer-readable storage medium may include but is not limited to: An electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof. In this application, the computer-readable storage medium may be any tangible medium including or storing a program, and the program may be used by or used in combination with an instruction execution system, apparatus, or device. In this application, a computer-readable signal medium may include a data signal in a baseband or propagated as a part of a carrier wave, the data signal carrying a computer-readable computer program. A data signal propagated in such a way may assume a plurality of forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in combination with an instruction execution system, apparatus, or device. The computer program included in the computer-readable storage medium may be transmitted using any suitable medium, including but not limited to: a wireless medium, a wire medium, or the like, or any suitable combination thereof.

The flowcharts and block diagrams in the accompanying drawings illustrate possible system architectures, functions, and operations that may be implemented by a system, a method, and a computer program product according to various embodiments of this application. Each box in a flowchart or a block diagram may represent a module, a program segment, or a part of code. The module, the program segment, or the part of code includes one or more executable instructions used for implementing designated logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

A related unit described in the embodiments of this application may be implemented in a software manner, or may be implemented in a hardware manner, and the unit described may also be set in a processor. Names of the units do not constitute a limitation on the units in a specific case.

In another aspect, this application further provides a computer readable medium. The computer readable medium may be included in the electronic device described in the above embodiments, or may exist alone without being assembled into the electronic device. The computer-readable medium carries one or more programs, the one or more programs, when executed by the electronic device, causing the electronic device to implement the method described in the foregoing embodiments.

Although a plurality of modules or units of a device configured to perform actions are discussed in the foregoing detailed description, such division is not mandatory. Actually, according to the implementations of this application, the features and functions of two or more modules or units described above may be specifically implemented in one module or unit. Conversely, features and functions of one module or unit described above may be further divided into a plurality of modules or units for implementation.

Through the descriptions of the foregoing implementations, a person skilled in the art easily understands that the exemplary implementations described herein may be implemented through software, or may be implemented through software located in combination with necessary hardware. Therefore, the technical solutions of the embodiments of this application may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the embodiments of this application.

After considering the specification and practicing the disclosed embodiments, a person skilled in the art may easily conceive of other implementations of this application. This application is intended to cover any variations, uses or adaptive changes of this application. Such variations, uses or adaptive changes follow the general principles of this application, and include well-known knowledge and conventional technical means in the art that are not disclosed in this application.

It is to be understood that this application is not limited to the precise structures described above and shown in the accompanying drawings, and various modifications and changes can be made without departing from the scope of this application. The scope of this application is limited by the appended claims only. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A video decoding method, performed by an electronic device, the method comprising:

obtaining an absolute value of a first direction component of a string vector difference (SVD) for a current block through decoding from a bitstream;

obtaining a sign value of the first direction component of the string vector difference through decoding from the bitstream, when the absolute value of the first direction component of the string vector difference is not 0;

determining a value of the first direction component of the string vector difference according to the absolute value of the first direction component of the string vector difference and the sign value of the first direction component of the string vector difference;

when a string vector predictor (SVP) is not obtained for the current block, using the string vector difference as a string vector (SV) for the current block, wherein SV=SVD;

when the string vector predictor is obtained for the current block, determining the string vector according to a sum of the string vector difference (SVD) and the string vector predictor, wherein SV=SVP+SVD; and performing intra string copy from a reference string to a target string in the current block using the string vector.

2. The video decoding method according to claim 1, wherein the obtaining an absolute value of a first direction component of a string vector difference through decoding from a bitstream comprises:

obtaining a prefix value of the first direction component of the string vector difference through decoding from the bitstream and performing inverse binarization based on truncated unary code; and generating the absolute value of the first direction component of the string vector difference according to the prefix value of the first direction component of the string vector difference.

3. The video decoding method according to claim 2, wherein the generating the absolute value of the first direction component of the string vector difference according to the prefix value of the first direction component of the string vector difference comprises:

using the prefix value of the first direction component of the string vector difference as the absolute value of the first direction component of the string vector difference, when the prefix value of the first direction component of the string vector difference is less than or equal to 4.

4. The video decoding method according to claim 2, wherein the generating the absolute value of the first direction component of the string vector difference according to the prefix value of the first direction component of the string vector difference comprises:

setting a compensation value to 5 when the prefix value of the first direction component of the string vector difference is equal to 5, performing, based on 2-bit fixed-length code, inverse binarization on 2 bits obtained by further decoding from the bitstream, to obtain a suffix value of the first direction component of the string vector difference, and generating the absolute value of the first direction component of the string vector difference according to the suffix value of the first direction component of the string vector difference and the compensation value.

5. The video decoding method according to claim 2, wherein the generating the absolute value of the first direction component of the string vector difference according to the prefix value of the first direction component of the string vector difference comprises:

setting a compensation value to 9 when the prefix value of the first direction component of the string vector difference is equal to 6, performing, based on 3-bit fixed-length code, inverse binarization on 3 bits obtained by further decoding from the bitstream, to obtain a suffix value of the first direction component of the string vector difference, and generating the absolute value of the first direction component of the string vector difference according to the suffix value of the first direction component of the string vector difference and the compensation value.

6. The video decoding method according to claim 2, wherein the generating the absolute value of the first direction component of the string vector difference according to the prefix value of the first direction component of the string vector difference comprises:

setting a compensation value to 17 when the prefix value of the first direction component of the string vector difference is equal to 7, and determining parity of the absolute value of the first direction component of the string vector difference based on 1 bit obtained by further decoding from the bitstream; and further decoding from the bitstream, performing inverse binarization based on 2-order exponential Golomb code, and generating the absolute value of the first direction component of the string vector difference according to a result of performing inverse binarization based on 2-order exponential Golomb code, the compensation value, and the parity of the absolute value of the first direction component of the string vector difference.

7. The video decoding method according to claim 2, wherein the generating the absolute value of the first direction component of the string vector difference according to the prefix value of the first direction component of the string vector difference comprises:

using the prefix value of the first direction component of the string vector difference as the absolute value of the first direction component of the string vector difference, when the prefix value of the first direction component of the string vector difference is less than or equal to 2.

8. The video decoding method according to claim 2, wherein the generating the absolute value of the first direction component of the string vector difference according to the prefix value of the first direction component of the string vector difference comprises:

setting a compensation value to 3 when the prefix value of the first direction component of the string vector difference is equal to 3, and determining parity of the absolute value of the first direction component of the string vector difference based on 1 bit obtained by further decoding from the bitstream; and further decoding from the bitstream, performing inverse binarization based on 0-order exponential Golomb code, and generating the absolute value of the first direction component of the string vector difference according to a result of performing inverse binarization based on 0-order exponential Golomb code, the compensation value, and the parity of the absolute value of the first direction component of the string vector difference.

9. The video decoding method according to claim 1, wherein the first direction component of the string vector difference is a vertical direction component of the string vector difference.

10. The video decoding method according to claim 1, further comprising:

decoding a sign value of a second direction component of the string vector difference from the bitstream;

performing inverse binarization based on $k_2$-order exponential Golomb code to obtain an absolute value of the second direction component of the string vector difference, in response to determining that a value of the second direction component of the string vector difference is less than 0 according to the sign value of the second direction component of the string vector difference, wherein $k_2 \geq 0$;

performing inverse binarization based on $t_2$-order exponential Golomb code to obtain the absolute value of the second direction component of the string vector difference, in response to determining that the value of the second direction component of the string vector difference is greater than 0 according to the sign value of the second direction component of the string vector difference, wherein $t_2 \geq 0$, and $t_2$ and $k_2$ are not equal; and determining the value of the second direction component of the string vector difference according to the absolute value of the second direction component of the string vector difference and the sign value of the second direction component of the string vector difference.

11. The video decoding method according to claim 10, further comprising:

determining that the value of the second direction component of the string vector difference is less than 0, when the sign value of the second direction component of the string vector difference is the first value; and determining that the value of the second direction component of the string vector difference is greater than 0, when the sign value of the second direction component of the string vector difference is a second value.

12. An electronic device, comprising:

one or more processors; and a storage apparatus, configured to store one or more programs, the one or more programs, when executed by the one or more processors, causing the electronic device to implement a video decoding method including:

obtaining an absolute value of a first direction component of a string vector difference (SVD) for a current block through decoding from a bitstream;

obtaining a sign value of the first direction component of the string vector difference through decoding from the bitstream, when the absolute value of the first direction component of the string vector difference is not 0;

determining a value of the first direction component of the string vector difference according to the absolute value of the first direction component of the string vector difference and the sign value of the first direction component of the string vector difference;

when a string vector predictor (SVP) is not obtained for the current block, using the string vector difference as a string vector (SV) for the current block, wherein SV=SVD;

when the string vector predictor is obtained for the current block, determining the string vector according to a sum of the string vector difference (SVD) and the string vector predictor, wherein SV=SVP+SVD; and performing intra string copy from a reference string to a target string in the current block using the string vector.

13. The electronic device according to claim 12, wherein the obtaining an absolute value of a first direction component of a string vector difference through decoding from a bitstream comprises:

obtaining a prefix value of the first direction component of the string vector difference through decoding from the bitstream and performing inverse binarization based on truncated unary code; and generating the absolute value of the first direction component of the string vector difference according to the prefix value of the first direction component of the string vector difference.

14. The electronic device according to claim 12, wherein the first direction component of the string vector difference is a vertical direction component of the string vector difference.

15. The electronic device according to claim 12, wherein the method further comprises:

decoding a sign value of a second direction component of the string vector difference from the bitstream;

performing inverse binarization based on $k_2$-order exponential Golomb code to obtain an absolute value of the second direction component of the string vector difference, in response to determining that a value of the second direction component of the string vector difference is less than 0 according to the sign value of the second direction component of the string vector difference, wherein $k_2 \geq 0$;

performing inverse binarization based on $t_2$-order exponential Golomb code to obtain the absolute value of the second direction component of the string vector difference, in response to determining that the value of the second direction component of the string vector difference is greater than 0 according to the sign value of the second direction component of the string vector difference, wherein $t_2 > 0$, and $t_2$ and $k_2$ are not equal; and determining the value of the second direction component of the string vector difference according to the absolute value of the second direction component of the string vector difference and the sign value of the second direction component of the string vector difference.

16. The electronic device according to claim 15, wherein the method further comprises:

determining that the value of the second direction component of the string vector difference is less than 0, when the sign value of the second direction component of the string vector difference is the first value; and determining that the value of the second direction component of the string vector difference is greater than 0, when the sign value of the second direction component of the string vector difference is a second value.

17. A non-transitory computer-readable medium, storing one or more programs, the one or more programs, when executed by one or more processors of an electronic device, causing the electronic device to implement a video decoding method including:

obtaining an absolute value of a first direction component of a string vector difference (SVD) for a current block through decoding from a bitstream;

obtaining a sign value of the first direction component of the string vector difference through decoding from the bitstream, when the absolute value of the first direction component of the string vector difference is not 0;

determining a value of the first direction component of the string vector difference according to the absolute value of the first direction component of the string vector difference and the sign value of the first direction component of the string vector difference;

when a string vector predictor (SVP) is not obtained for the current block, using the string vector difference as a string vector (SV) for the current block, wherein SV=SVD;

when the string vector predictor is obtained for the current block, determining the string vector according to a sum of the string vector difference (SVD) and the string vector predictor, wherein SV=SVP+SVD; and performing intra string copy from a reference string to a target string in the current block using the string vector.

18. The non-transitory computer-readable medium according to claim 17, wherein the obtaining an absolute value of a first direction component of a string vector difference through decoding from a bitstream comprises:

obtaining a prefix value of the first direction component of the string vector difference through decoding from the bitstream and performing inverse binarization based on truncated unary code; and generating the absolute value of the first direction component of the string vector difference according to the prefix value of the first direction component of the string vector difference.

19. The non-transitory computer-readable medium according to claim 17, wherein the first direction component of the string vector difference is a vertical direction component of the string vector difference.

20. The non-transitory computer-readable medium according to claim 17, wherein the method further comprises:

decoding a sign value of a second direction component of the string vector difference from the bitstream;

performing inverse binarization based on $k_2$-order exponential Golomb code to obtain an absolute value of the second direction component of the string vector difference, in response to determining that a value of the second direction component of the string vector difference is less than 0 according to the sign value of the second direction component of the string vector difference, wherein $k_2 \geq 0$;

performing inverse binarization based on $t_2$-order exponential Golomb code to obtain the absolute value of the second direction component of the string vector difference, in response to determining that the value of the second direction component of the string vector difference is greater than 0 according to the sign value of the second direction component of the string vector difference, wherein $t_2 \geq 0$, and $t_2$ and $k_2$ are not equal; and determining the value of the second direction component of the string vector difference according to the absolute value of the second direction component of the string vector difference and the sign value of the second direction component of the string vector difference.

* * * * *